(12) United States Patent
Ahn et al.

(10) Patent No.: US 9,801,103 B2
(45) Date of Patent: Oct. 24, 2017

(54) METHOD AND APPARATUS FOR CELL TO DISCOVER ANOTHER CELL

(71) Applicant: LG ELECTRONICS INC., Seoul (KR)

(72) Inventors: Joonkui Ahn, Seoul (KR); Daesung Hwang, Seoul (KR); Yunjung Yi, Seoul (KR); Dongyoun Seo, Seoul (KR); Suckchel Yang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 6 days.

(21) Appl. No.: 14/778,993

(22) PCT Filed: Mar. 31, 2014

(86) PCT No.: PCT/KR2014/002727
§ 371 (c)(1),
(2) Date: Sep. 21, 2015

(87) PCT Pub. No.: WO2014/163350
PCT Pub. Date: Oct. 9, 2014

(65) Prior Publication Data
US 2016/0057664 A1 Feb. 25, 2016

Related U.S. Application Data

(60) Provisional application No. 61/808,198, filed on Apr. 3, 2013, provisional application No. 61/810,744, filed on Apr. 11, 2013.

(51) Int. Cl.
*H04W 36/00* (2009.01)
*H04J 11/00* (2006.01)
(Continued)

(52) U.S. Cl.
CPC ..... *H04W 36/0061* (2013.01); *H04J 11/0069* (2013.01); *H04L 5/0053* (2013.01);
(Continued)

(58) Field of Classification Search
None
See application file for complete search history.

(56) References Cited

U.S. PATENT DOCUMENTS

| 2010/0222062 A1 | 9/2010 | Chou et al. |
| 2010/0261467 A1 | 10/2010 | Chou et al. |
| 2015/0018002 A1* | 1/2015 | Touag ............... H04W 16/14 455/454 |

FOREIGN PATENT DOCUMENTS

| KR | 10-2012-0009913 | 2/2012 |
| KR | 10-2012-0119826 | 10/2012 |

(Continued)

OTHER PUBLICATIONS

PCT International Application No. PCT/KR2014/002727, Written Opinion of the International Authority dated Jun. 27, 2014, 1 page.
(Continued)

*Primary Examiner* — Kouroush Mohebbi
(74) *Attorney, Agent, or Firm* — Lee, Hong, Degerman, Kang & Waimey

(57) ABSTRACT

Disclosed are a method and an apparatus for a cell to discover another cell. A method for cell discovery by a discovering cell may comprises the step of: the discovering cell receiving first discovering resource configuration information from a master cell; and the discovering cell receiving a discovering signal from at least one discovering target cell on the basis of the first discovering resource configuration information, wherein the first discovering resource configuration information may comprise information indicating a first time resource for the discovering cell to receive a discovery signal by means of a first frequency band, and
(Continued)

information indicating a second time resource for the discovering cell to transmit downlink data to a terminal by means of the first frequency band.

12 Claims, 20 Drawing Sheets

(51) Int. Cl.
    *H04L 5/00*     (2006.01)
    *H04W 36/04*     (2009.01)
    *H04W 84/20*     (2009.01)
    *H04W 48/16*     (2009.01)
    *H04W 24/02*     (2009.01)

(52) U.S. Cl.
    CPC ........... *H04W 36/04* (2013.01); *H04W 48/16* (2013.01); *H04W 84/20* (2013.01); *H04W 24/02* (2013.01)

(56) References Cited

FOREIGN PATENT DOCUMENTS

WO      2011/137152      11/2011
WO      2014043665 A2      3/2014

OTHER PUBLICATIONS

Huawei et al., "Interference mitigation schemes for TDD eIMTA", 3GPP TSG RAN WG1 Meeting #72, R1-130015, Jan. 19, 2013, 5 pages.
CMCC, "Discussion on common solution to support efficient operation for Rel-12 small cell", 3GPP TSG-RAN WG1 #72, R1-130537, Jan. 19, 2013, 7 pages.
NTT DOCOMO, "Overview of Mobility Enhancement for Small Cell Enhancement", 3GPP TSG RAN WG1 Meeting #72, R1-130405, Jan. 19, 2013, 8 pages.
European Patent Office Application No. 14779432.5, Search Report dated Nov. 3, 2016, 10 pages.

\* cited by examiner

METHOD AND APPARATUS FOR CELL TO DISCOVER ANOTHER CELL

CROSS-REFERENCE TO RELATED APPLICATIONS

This application is the National Stage filing under 35 U.S.C. 371 of International Application No. PCT/KR2014/002727, filed on Mar. 31, 2014, which claims the benefit of U.S. Provisional Application No. 61/808,198, filed on Apr. 3, 2013 and 61/810,744, filed on Apr. 11, 2013, the contents of which are all hereby incorporated by reference herein in their entirety.

BACKGROUND OF THE INVENTION

Field of the Invention

The present invention relates to wireless communications, and more particularly, to a method and an apparatus for a cell to discover another cell.

Related Art

Long-Term Evolution (LTE) based on 3rd Generation Partnership Project (3GPP) Technical Specification (TS) Release 8 is a leading next-generation mobile communication standard.

As set forth in 3GPP TS 36.211 V8.7.0(2009-05) "Evolved Universal Terrestrial Radio Access (E-UTRA); Physical Channels and Modulation (Release 8)," physical channels in LTE may be classified into downlink channels, such as physical downlink shared channel (PDSCH) and physical downlink control channel (PDCCH), and uplink channels, such as physical uplink shared channel (PUSCH) and physical uplink control channel (PUCCH). The PUCCH is an uplink control channel used for transmitting uplink control information, such as a hybrid automatic repeat request (HARQ) acknowledgement (ACK)/non-acknowledgement (NACK) signal, a channel quality indicator (CQI) and a scheduling request (SR).

An evolution of 3GPP LTE, LTE-Advanced (LTE-A), is developing. Among various Release-12 technology work items, standardization of techniques for a small base station (small eNB or small cell) used to cover a smaller area than that covered by an existing macro-base station (or macro-cell) is in progress. Base stations may be classified into macro-, pico- and femto-base stations depending on the size of coverage. A macro-base station is a generally used base station, which may cover a wider area than a pico-base station. Thus, the macro-base station may use relatively greater power than the pico-base station. The pico-base station may cover a small area for a hotspot or coverage hole. Generally, the pico-base station may use relatively lower power than the macro-base station. Thus, the pico-base station may have inferior connection reliability to the macro-base station. For a situation where a macro-base station and a small base station coexist, various methods may be used to efficiently utilize network resources. For example, traffic may be offloaded from the macro-base station to a small base station depending on a load condition of the macro-base station. When this method is used, the network load of the macro-base station may be adjusted to increase network efficiency. Further, by using difference in connection conditions between the macro-base station and the small base station, the respective base stations may process different kinds of quality of service (QoS) traffic. A UE may perform dual connectivity to connect to the macro-base station and the small base station at the same time so as to transmit and receive traffic.

SUMMARY OF THE INVENTION

An aspect of the present invention is to provide a method for a cell to discover another cell.

Another aspect of the present invention is to provide an apparatus for a cell to discover another cell.

To achieve an aspect of the present invention, a cell discovering method of a discovering cell according to one embodiment of the present invention may include receiving, by the discovering cell, first discovering resource configuration information from a master cell; and receiving, the discovering cell, a discovery signal from at least one discovering target cell on the basis of the first discovering resource configuration information, wherein the first discovering resource configuration information may include information indicating a first time resource for the discovering cell to receive the discovery signal through a first frequency band and information indicating a second time resource for the discovering cell to transmit downlink data to a UE through the first frequency band.

To achieve another aspect of the present invention, a base station of a discovering cell which performs cell discovering according to one embodiment of the present invention may include a radio frequency (RF) unit configured to transmit and receive a radio signal and a processor selectively connected to the RF unit, wherein the processor is configured to receive first discovering resource configuration information from a master cell and to receive a discovery signal from at least one discovering target cell on the basis of the first discovering resource configuration information, the first discovering resource configuration information may include information indicating a first time resource for the discovering cell to receive a discovery signal through a first frequency band and information indicating a second time resource for the discovering cell to transmit downlink data to a UE through the first frequency band.

A cell discovers another cell based on a discovery signal, thereby quickly acquiring changed network topology information when a cell (for example, a small cell) is changed (for example, a small cell is turned on/off or a small cell moves) in a network.

DESCRIPTION OF EXEMPLARY EMBODIMENTS

A wireless device may be fixed or mobile, and may be referred to as another terminology, such as a user equipment (UE), a mobile station (MS), a mobile terminal (MT), a user terminal (UT), a subscriber station (SS), a personal digital assistant (PDA), a wireless modem, a handheld device, a terminal, a wireless terminal, etc. Also, the wireless device may be a device that supports data communication only such as a machine-type communication device.

A base station (BS) is generally a fixed station that communicates with the wireless device and may be referred to as another terminology, such as an evolved Node-B (eNB), a base transceiver system (BTS), an access point, etc.

Figure 1:
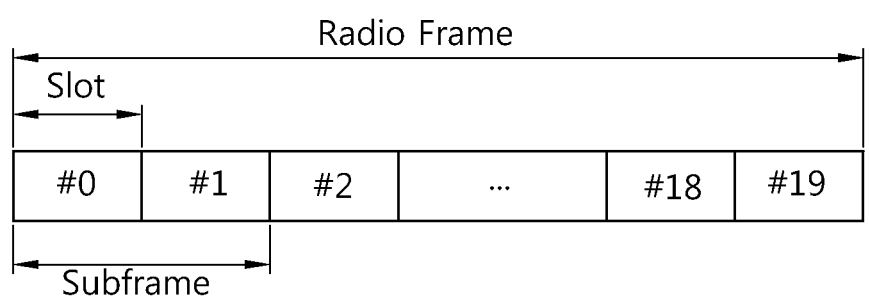
FIG. 1 illustrates a structure of a radio frame in a Long Term Evolution (LTE) system.

FIG. 1 shows the structure of a radio frame in 3GPP LTE.

It may be referred to Paragraph 5 of "Technical Specification Group Radio Access Network; Evolved Universal Terrestrial Radio Access (E-UTRA); Physical channels and modulation (Release 8)" to 3GPP (3rd generation partnership project) TS 36.211 V8.2.0 (2008-03).

Referring to FIG. 1, the radio frame includes 10 subframes 120, and one subframe includes two slots 140. The radio frame may be indexed based on slot 140, that is, from slot #0 to #19 or may be indexed based on subframe 120, that is, from subframe #0 to subframe #9. For example, subframe #0 may include slot #0 and slot #1.

A time taken for transmitting one subframe 120 is called a transmission time interval (TTI). The TTI may be a scheduling basis for a data transmission. For example, a radio frame may have a length of 10 ms, a subframe may have a length of 1 ms, and a slot may have a length of 0.5 ms.

One slot 140 includes a plurality of orthogonal frequency division multiplexing (OFDM) symbols in a time domain and a plurality of subcarriers in a frequency domain. In LTE, a BS uses OFDMA as an access method in downlink channel. The OFDM symbols are used to express a symbol period, and may be called by other names depending on a multiple-access scheme. For example, in an uplink channel in which a wireless device transmits data to a BS, a single carrier-frequency division multiple access (SC-FDMA) may be used. The symbol section in which data is transmitted through uplink channel may be referred to as a SC-FDMA symbol.

The structure of radio frame 100 introduced in FIG. 1 is an embodiment for the frame structure. Accordingly, new radio frame format may be defined by changing the number of subframes 120, the number of slots 140 included in the subframe 120, or the number of OFDM symbols included in the slot 140.

In the radio frame structure, the number of symbols included in a slot may be changed depending on which cyclic prefix (CP) is used. For example, when the radio frame uses a normal CP, one slot may include seven OFDM symbols. When the radio frame uses an extended CP, one slot may include six OFDM symbols.

The wireless communication system may be divided into a frequency division duplex (FDD) scheme and a time division duplex (TDD) scheme. According to the FDD scheme, an uplink transmission and a downlink transmission may be performed based on different frequency bands. According to the TDD scheme, an uplink transmission and a downlink transmission may be performed based on the same frequency band by using time division scheme. A channel response of the TDD scheme is substantially reciprocal since it uses the same frequency band. That is, in TDD scheme, a downlink channel response and an uplink channel response are almost the same in a given frequency band. Thus, the TDD-based wireless communication system may obtain the channel state information from the channel state information of uplink channel. In the TDD scheme, the entire frequency band is time-divided for uplink and downlink transmissions, so a downlink transmission by the BS and an uplink transmission by the wireless device cannot be simultaneously performed.

Figure 2:
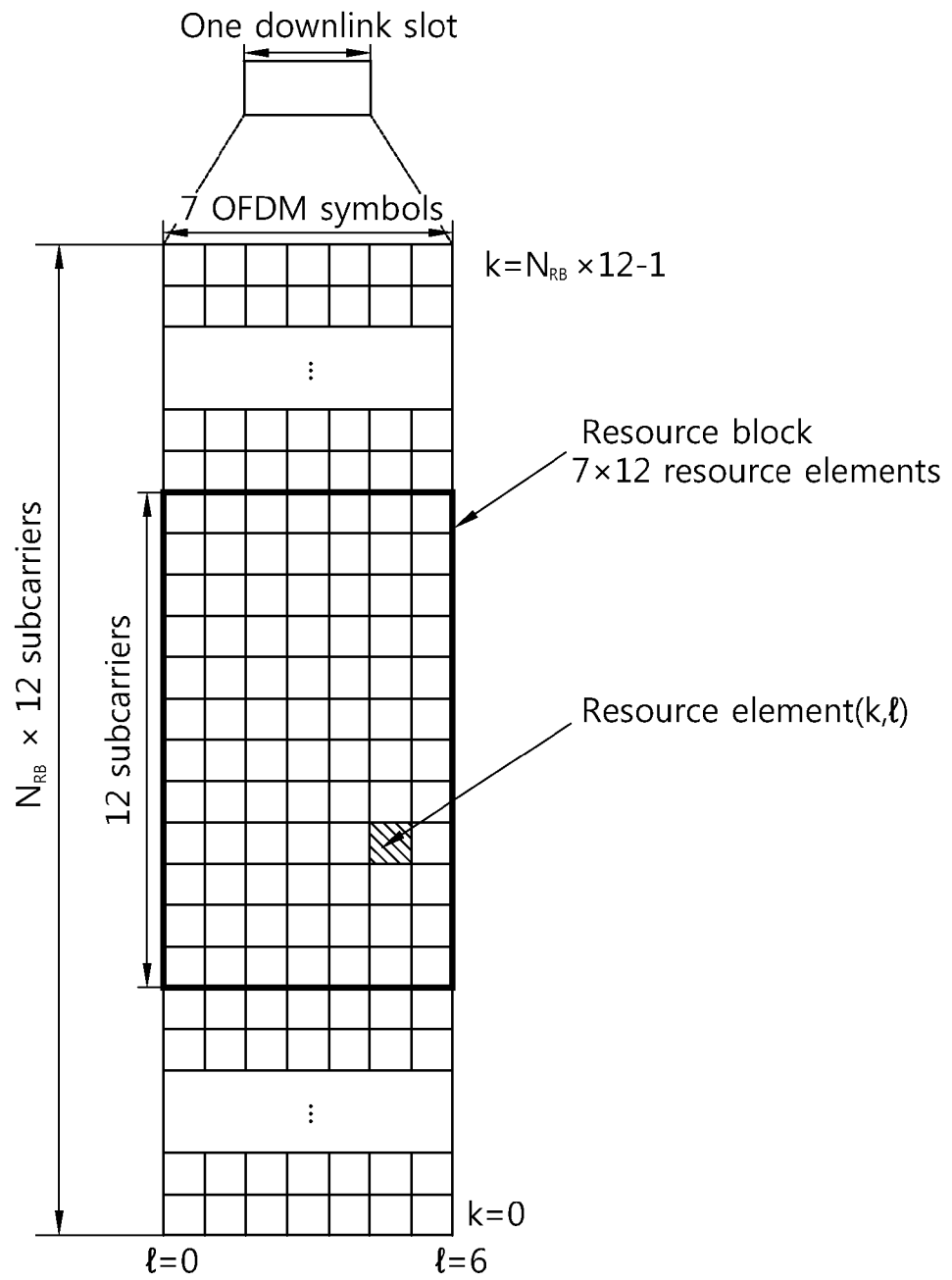
FIG. 2 illustrates an example of a resource grid for a downlink slot.

FIG. 2 shows an example of a resource grid of a downlink slot.

A downlink slot includes a plurality of OFDM symbols in the time domain and NRB number of resource blocks in the frequency domain. The NRB number of resource blocks included in the downlink slot may be determined depending upon a downlink transmission bandwidth which is configured in a cell. For example, in an LTE system, NRB may have any one value of 60 to 110 depending upon the transmission bandwidth which is used. One resource block 200 includes a plurality of subcarriers in the frequency domain. An uplink slot may have the same structure as that of the downlink slot.

Each element on the resource grid is called a resource element 220. The resource elements 220 on the resource grid can be discriminated by a pair of indexes (k,l) in the slot.

Here, k (k=0, . . . , NRB×12-1) is a subcarrier index in the frequency domain, and l (l=0, . . . , 6) is an OFDM symbol index in the time domain.

Herein, one resource block 200 may include 7×12 resource elements made up of seven OFDM symbols in the time domain and twelve subcarriers in the frequency domain. Such a size is just an example, and the number of OFDM symbols and subcarriers constituting one resource block 200 may be changed. The resource block pair indicates a resource basis that includes two resource blocks.

As described above, the number of OFDM symbols in one slot may have different values depending on the CP. Also, the number of resource blocks included in one slot may be changed depending on the size of overall frequency bandwidth.

Figure 3:
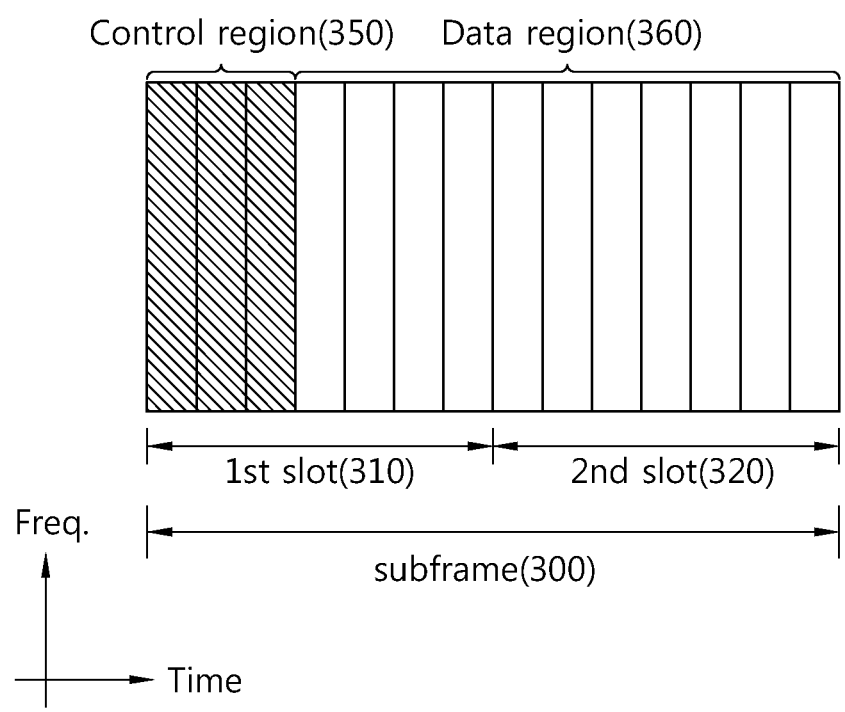
FIG. 3 illustrates a structure of a downlink (DL) subframe.

FIG. 3 shows the structure of a downlink subframe.

A downlink subframe 300 may be distinguished into two slots 310 and 320 base on the time domain. Each of the slots 310 and 320 includes seven OFDM symbols in the normal CP. A resource region that corresponds to first three OFDM symbols (maximum four OFDM symbols with respect to a 1.4 MHz bandwidth) of a first slot 310 in the subframe 300 may be used as a control region 350 to which control channels are allocated. The other remaining OFDM symbols may be used as a data region 360 to which a traffic channel such as a physical downlink shared channel (PDSCH) is allocated.

The PDCCH may be a control channel that transmits, for example, a transmission format and a resource allocation of a downlink shared channel (DL-SCH), resource allocation information of an uplink shared channel (UL-SCH), paging information on a PCH, system information on a DL-SCH, a resource allocation of an higher layer control message such as a random access response transmitted via a PDSCH, a set of transmission power control commands with respect to individual wireless devices in a certain UE group, an activation of a voice over internet protocol (VoIP), and the like. A plurality of bases that transmits the PDCCH data may be defined in the control region 350. A wireless device may obtain control data by monitoring the plurality of bases that transmits the PDCCH data. For example, the PDCCH data may be transmitted to a wireless device based on one or an aggregation of a plurality of consecutive control channel elements (CCE). The CCE may be a basis of transmitting the PDCCH data. The CCE may include a plurality of resource element groups. The resource element group is a resource basis that includes four usable resource elements.

The BS determines a PDCCH format according to a DCI to be transmitted to the wireless device, and attaches a cyclic redundancy check (CRC) to the DCI. A unique radio network temporary identifier (RNTI) is masked on the CRC according to the owner or the purpose of the PDCCH. In case of a PDCCH for a particular wireless device, a unique identifier, e.g., a cell-RNTI (C-RNTI), of the wireless device, may be masked on the CRC. Or, in case of a PDCCH for a paging message, a paging indication identifier, e.g., a paging-RNTI (P-RNTI), may be masked on the CRC. In case of a PDCCH for a system information block (SIB), a system information identifier, e.g., a system information-RNTI (SI-RNTI), may be masked on the CRC. In order to indicate a random access response, i.e., a response to a transmission of a random access preamble of the wireless device, a random access-RNTI (RA-RNTI) may be masked on the CRC.

Figure 4:
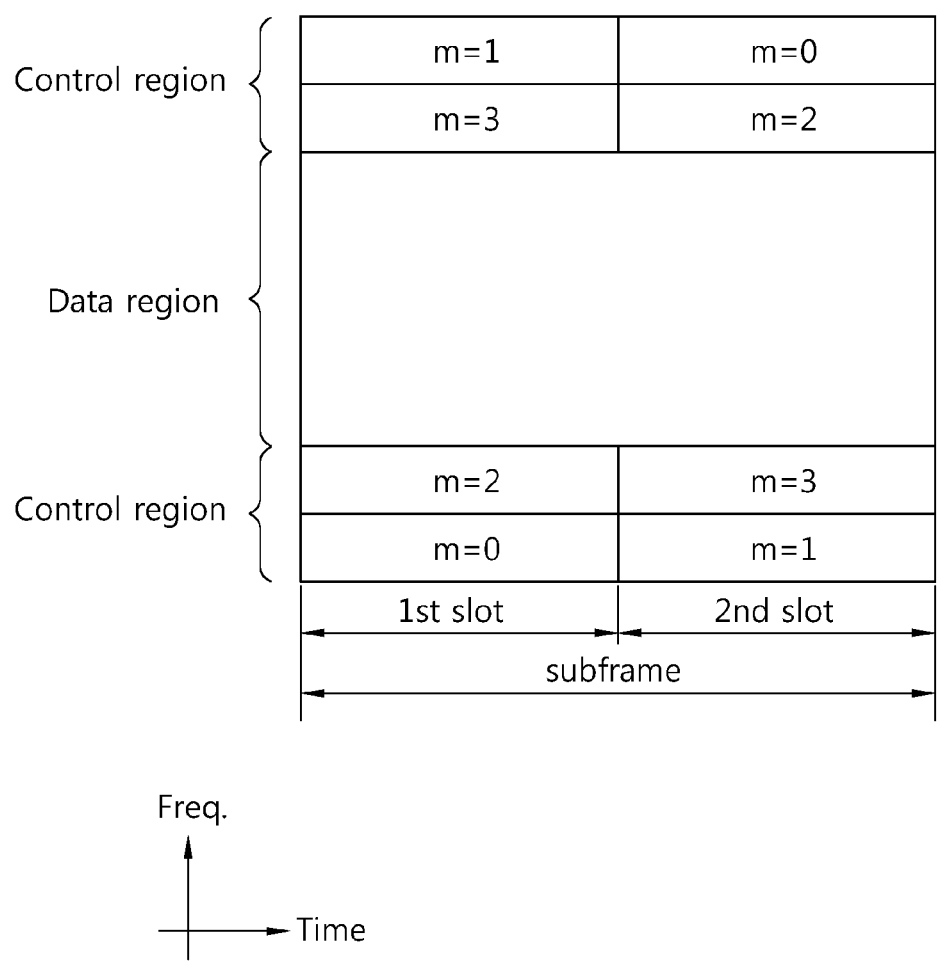
FIG. 4 illustrates a structure of an uplink (UL) subframe in 3rd Generation Partnership Project (3GPP) LTE.

FIG. 4 is a view illustrating the structure of an uplink subframe in 3GPP LTE.

The uplink subframe may be divided into a control region allocated to a physical uplink control channel (PUCCH) for delivering uplink control information and a data region allocated to a physical uplink shared channel (PUSCH) for delivering user data. PUCCH resources for allocation may be located at the edge of bandwidth of a component carrier (CC).

The PUCCH may be allocated based on a RB pair in the subframe. RBs corresponding to the RB pair may be allocated to different subcarriers in a first and a second slots respectively. m is a position index indicating the position of a logical frequency domain of the RB pair which is allocated to the PUCCH in the subframe. RBs having the same value of m are allocated to different subcarriers of the first and second slots.

According to 3GPP TS 36.211 V8.7.0, the PUCCH may have various formats. It is possible to use Different PUCCH formats with different bit numbers in the subframe according to a modulation scheme for use in the PUCCH format.

Table 2 shows an example of bit numbers per subframe and the modulation scheme according to the PUCCH format.

TABLE 2

| PUCCH format | Modulation scheme | bit number per subframe |
|---|---|---|
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + BPSK | 22 |
| 3 | QPSK | 48 |

PUCCH format 1 for scheduling request (SR) transmission, PUCCH format 1a/1b for transmitting an ACK/NACK signal for HARQ, PUCCH format 2 for CQI transmission, and PUCCH format 2a/2b for simultaneous transmission of the CQI and the ACK/NACK signals are used. When only the ACK/NACK signal is transmitted in the subframe, PUCCH format 1a/1b is used, and when only the SR is transmitted, PUCCH format 1 is used. When the SR and the ACK/NACK signal are transmitted simultaneously, PUCCH format 1 is used, and the ACK/NACK signal is transmitted after being modulated to resources allocated to the SR.

The entire PUCCH formats use cyclic shift (CS) of a sequence for each OFDM symbol. A base sequence is cyclically shifted by specific CS amount to generate a cyclic shift sequence. The specific CS amount is indicated by a CS index.

The sequence length is equal to the number of an element included in the sequence. The sequence index for indicating the sequence may be determined based on a cell identifier, a slot number within a radio frame, and the like. Assuming that a base sequence is mapped to one resource block in the frequency domain, one resource block includes 12 subcarriers, and thus the length of the base sequence N is 12. The cyclic shift sequence may be generated by cyclically shifting the base sequence.

The available cyclic shift index to the base sequence may be induced from the base sequence based on a CS interval. For example, when the base sequence length is 12 and the CS interval is 2, total number of the available cyclic shift indices to the base sequence is 6. Hereinafter, HARQ ACK/NACK signal transmission in PUCCH format 1b will be described.

Figure 5:
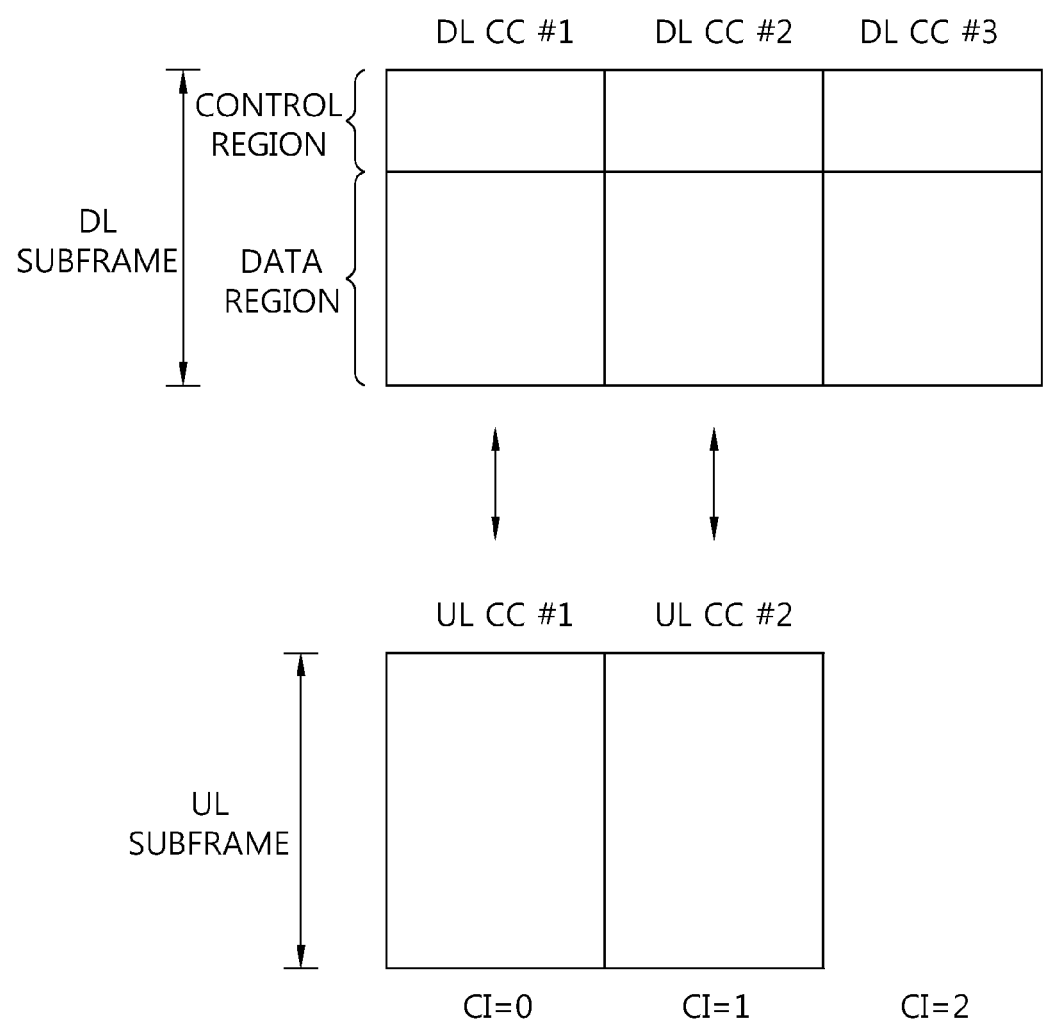
FIG. 5 is a schematic view illustrating a multiple carrier in an LTE-Advanced (LTE-A) system.

FIG. 5 is a schematic view illustrating a multiple carrier in an LTE-A system.

A 3GPP LTE system supports a case where a DL bandwidth and a UL bandwidth are configured differently, in which one component carrier (CC) is required for each of a DL and a UL. The 3GPP LTE system supports up to 20 MHz, in which the DL bandwidth and the UL bandwidth may be different but one CC is supported for each of the UL and DL.

However, an LTE-A system may support a plurality of CCs through spectrum aggregation (also referred to as bandwidth aggregation or carrier aggregation). For example, when five CCs are allocated as a granularity of a carrier unit with a bandwidth of 20 MHz, the LTE-A system may support a bandwidth of up to 100 MHz.

One DL CC or a pair of a UL CC and a DL CC may correspond to one cell. Thus, it is understood that a UE communicating with a base station through a plurality of DL CCs is provided with services from a plurality of serving cells.

FIG. 5 illustrates three DL CCs and two UL CCs which are subjected to carrier aggregation. The number of DL CCs and UL CCs subjected to carrier aggregation is not limited. A PDCCH and PDSCH are independently transmitted in each DL CC, and a PDCCH and PDSCH are independently transmitted in each UL CC. Two DL CC-UL CC pairs and one DL carrier are defined, which means that a UE is provided with services from three serving cells.

The UE may monitor a PDCCH in a plurality of DL CCs and simultaneously receive DL transport blocks through the plurality of DL CCs. Further, the UE may simultaneously transmit a plurality of UL transport blocks through a plurality of UL CCs.

A pair of a first DL CC (DL CC #1) and a first UL CC (UL CC #1) may be a first serving cell, a pair of a second DL CC (DL CC #2) and a second UL CC (UL CC #2) may be a second serving cell, and a third DL CC (DL CC #3) may be a third serving cell. Each serving cell may be identified by a cell index (CI). A CI may be unique for a cell or have a UE-specific value. Here, for example, the first to third serving cells are allocated CIs of 0, 1, 2, respectively.

Serving cells may be classified into a primary cell or P-cell and a secondary cell or S-cell. A P-cell may also be referred to as a primary component carrier (PCC), and an S-cell may also be referred to as a second component carrier (SCC). A P-cell may be designated in an initial connection establishment procedure, connection reestablishment procedure and handover procedure of a UE. A P-cell may alternatively be referred to as a reference cell. An S-cell may be configured after a radio resource control (RRC) connection is established and be used for providing additional radio resources. At least one P-cell is always configured and an S-cell may be added/revised/cancelled by higher-level signaling (for example, an RRC message).

A P-cell may have a fixed CI. For example, a lowest CI may be designated as a CI of the P-cell. Specifically, the CI of the P-cell may be allocated 0, and CIs of S-cells may be allocated sequential values from 1.

The UE may monitor a PDCCH through a plurality of serving cells. However, even in the presence of N serving cells, a base station may configure the UE to monitor PDCCHs of M (M≤N) serving cells. Further, the base station may configure the UE to preferentially monitor PDCCHs of L (L≤M≤N) serving cells.

In performing carrier aggregation in LTE-A, non-cross carrier scheduling and cross-carrier scheduling may be used. In non-cross carrier scheduling, when DL transmission is performed through a particular DL CC, UL transmission may be performed only through a UL CC corresponding to the particular DL CC.

In detail, a DL allocation and a UL grant, transmitted through a PDCCH of a DL CC of a particular cell, may be used for scheduling a PDSCH/PUSCH of the cell to which the DL CC belongs (the cell is constituted by the DL CC or a UL CC corresponding to the DL CC). A relationship between the DL CC and the UL CC may be configured through system information block (SIB)-2. That is, a search space that is a region for detecting the DL allocation and UL grant may be included in the PDCCH of the cell in which the PDSCH/PUSCH to be scheduled is located.

In cross-carrier scheduling, a monitored cell may be configured. A DL allocation and a UL grant, transmitted in a PDCCH region of the monitored cell, may be a DL allocation and a UL grant for a cell configured to be scheduled in the monitored cell. That is, in cross-carrier scheduling, the PDCCH of the monitored cell may transmit resource scheduling information on a plurality of CCs.

Figure 6:
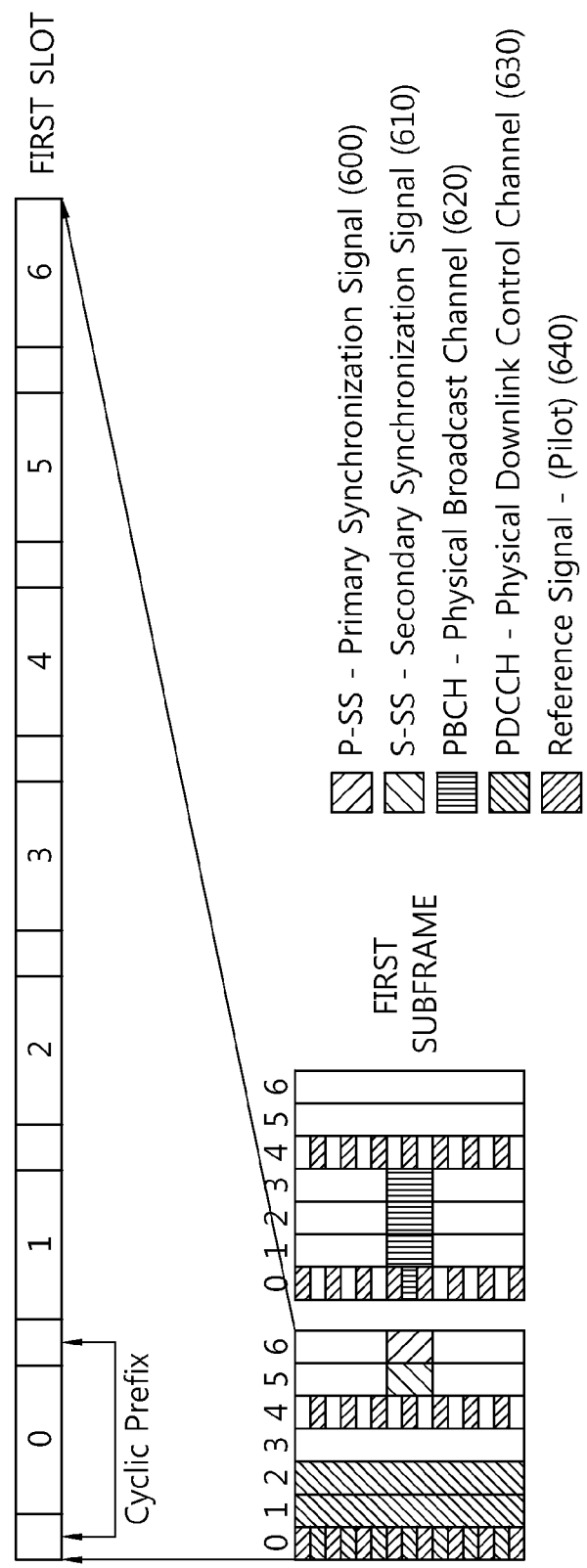
FIG. 6 is a schematic view illustrating a structure of a DL subframe.

FIG. 6 is a schematic view illustrating a structure of a DL subframe.

FIG. 6 briefly illustrates signals or channels transmitted through a DL subframe, a primary synchronization signal (PSS) 600, a secondary synchronization signal (SSS) 610, a physical broadcast channel (PBCH) 620, a physical downlink control channel (PDCCH) 630 and a reference signal 640.

The PSS 600 may be used for cell identifier (ID) detection which determines which cell a current cell is in a cell ID group and for half-frame timing detection which detects a timing corresponding to half of a frame.

The SSS 610 may be used for cell ID group detection which determines which cell ID group a current cell is and frame boundary detection which detects a timing by the frame.

The PBCH 620 is a channel detected first after a UE performs a cell search and may be mapped to a broadcast channel (BCH) as a transport channel for transporting a master information block (MIB) that is pieces of basic system information definitely necessary for receiving other physical layer channels.

The PDCCH 630 may transmit information for a DL resource allocation and an UL scheduling grant.

The reference signal 640 may be a cell-specific reference signal (CRS). The CRS may be transmitted through all DL subframes in an entire frequency band and be used to demodulate DL data.

In a next-generation cellular communication system, a scenario may be assumed in which a small cell as a down-sized low-power base station is configured and a large number of smaller cells are densely installed in a hot spot area. A small cell may be a cell having relatively smaller coverage than macrocell coverage and performing transmission with lower power than a macrocell. For example, the small cell may be a pico-base station, a femto-base station, or the like. Particularly, small cells may be installed at random without a relatively accurate cell plan as compared with existing macrocells. Further, the small cells may be moved to be installed at random places or to be removed.

Figure 7:
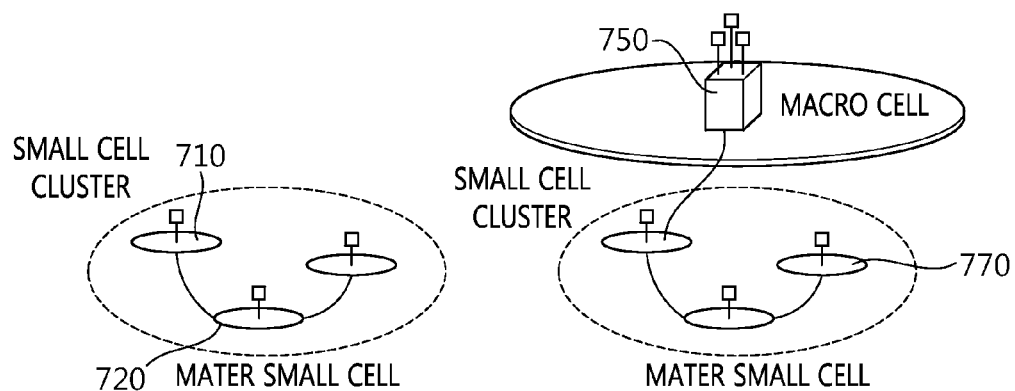
FIG. 7 is a schematic view illustrating a cell scenario based on small cells.

FIG. 7 is a schematic view illustrating a cell scenario based on small cells.

On a left side of FIG. 7 is illustrated a method of managing a plurality of small cells 700 through a backhaul when the small cells 700 form a group and a master small cell 720 is connected to different small cells 700 in the group through the backhaul.

On a right side of FIG. 7 is illustrated a scenario in which a small cell 770 and a macrocell 750 coexist in the same coverage area. The macrocell 750 may be connected to small cells 700 in the coverage area of the macrocell 750 through a backhaul to manage the small cells 770 or be connected to a master small cell in a small cell group through the backhaul to manage the small cells.

In a scenario of using a plurality of small cells, topology information on a small cell network may be needed for network management. Topology of the small cell network may be changed irregularly when a small cell is randomly installed, removed or moved. The topology information on the small cell network may be generated based on information on presence of a small cell and on a neighbor small cell neighboring the small cell and information related to the neighbor small cell.

The topology information on the small cell network may be generated by a random small cell detecting and measuring signals wirelessly transmitted by adjacent small cells.

Hereinafter, an embodiment of the present invention illustrates an operation of transmitting a discovery signal (DS) between small cells and detecting (or monitoring) the DS and an operation of transmitting a DS between a macrocell and a small cell and detecting the DS in order to acquire topology information on a small cell network.

According to the embodiment of the present invention, a signal which a small cell receives from a neighbor small cell in order to discover the neighbor small cell may be represented as a discovery signal. Further, the small cell which receives the discovery signal and discovers the neighbor cell may also be referred to as a discovering cell, and the small cell which transmits the discovery signal may also be referred to as a discovering target cell. In addition, a master small cell or macrocell which manages the discovering cell and the discovering target cell may also be referred to as a master cell.

A small cell may detect and receive a discovery signal transmitted by a neighbor small cell. The small cell may acquire information related to the neighbor small cell based on the received discovery signal. For example, the small cell may measure intensity of the discovery signal to acquire location information on the neighbor small cell and information on interference between the neighbor small cell and the small cell. When the discovery signal is transmitted and received by a neighbor small cell group, the small cell may acquire not only information related to the neighbor small cell transmitting the discovery signal but information related to a neighbor small cell group based on the received discovery signal, which will be described later in detail.

In the existing LTE system, a discovery signal may be an existing signal or channel, such as PSS/SSS/CRS/ channel state information (CSI)-reference signal (RS)/demodulation (DM)-RS/PBCH, or newly defined signal or channel.

In the embodiment of the present invention, a discovery signal may also be applied to not only an operation between the small cell and the macrocell but also an operation between other network components which perform wireless transmission and reception. A subject which transmits a message (for example, a discovery signal detection instruction message) to a small cell through a backhaul may be a cable network component, such as a gateway, other than the macrocell or another small cell. In the following embodiments of the present invention, a discovery cell is assumed to be transmitted by a macrocell or small cell.

Figure 8:
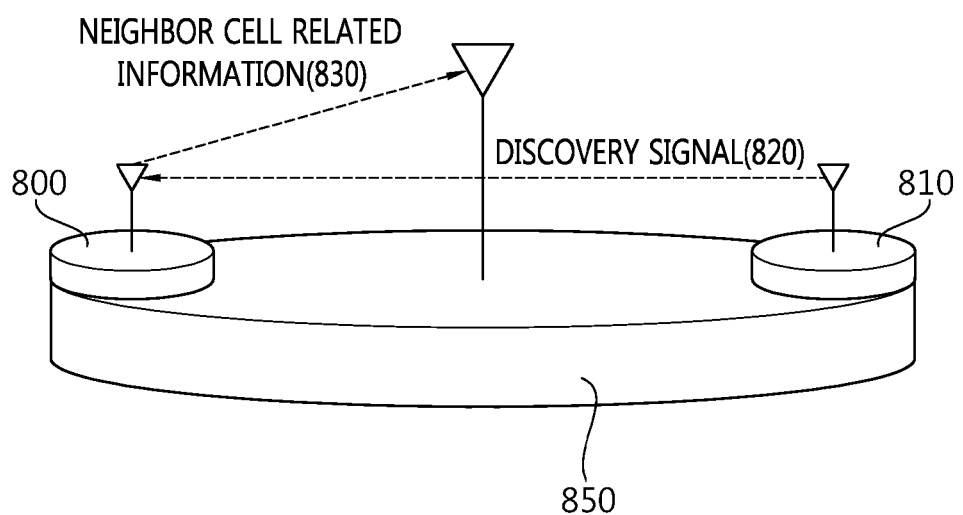
FIG. 8 is a schematic view illustrating detection of a discovery signal by a small cell according to an embodiment of the present invention.

FIG. 8 is a schematic view illustrating detection of a discovery signal by a small cell according to an embodiment of the present invention.

Referring to FIG. 8, a small cell 800 operating at a particular location may detect (or monitor) a discovery signal 820 transmitted by a neighbor cell (neighbor small cell or macrocell) 810 to receive the discovery signal 820 when starting to operate. The small cell 800 may determine neighbor cell related information 830 based on the received discovery signal 820.

The small cell 800 may transmit the neighbor cell related information 830 to the master small cell or macrocell 850 through a backhaul. The neighbor cell related information 830 may include at least one of ID information on the discovery signal, ID information on the neighbor cell transmitting the discovery signal, ID information on a neighbor cell group transmitting the discovery signal and signal quality information, such as reference signal received power (RSRP)/reference signal received quality (RSRQ) of the discovery signal. In addition, the neighbor cell related information 830 may include information on various discovery signals and information on neighbor cells transmitting the discovery signals.

A procedure of determining the neighbor cell related information 830 based on the discovery signal 820 may be performed in the small cell 800, which starts a new operation. In addition, the small cell 800, which is already installed and is operating in a network, may perform the procedure of determining the neighbor cell related information 830 based on the discovery signal 820 according to changes in a network environment (location changes of neighbor cells, start of an operation of a new cell, or the like). That is, when the network environment is changed, the small cell may generate the neighbor cell related information 830 based on the discovery signal 820 received from the neighbor cell 810 and transmit the neighbor cell related information to the master small cell or macrocell 850.

A procedure in which the small cell 800 in the network receives the discovery signal 820 from the neighbor cell 810 and generates the neighbor cell related information 830 may be referred to as a discovery signal-based measurement procedure. The discovery signal-based measurement procedure may be defined variously.

Figure 9:
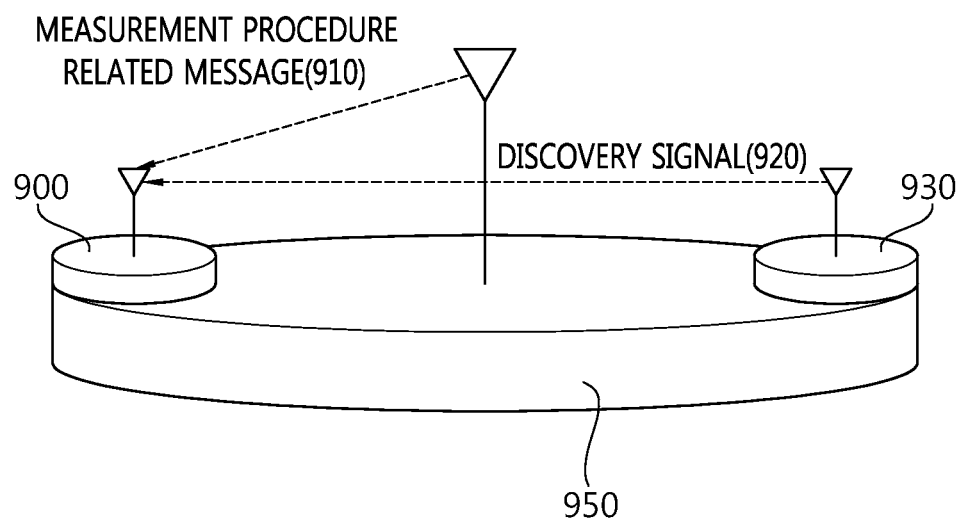
FIG. 9 is a schematic view illustrating a discovery signal-based measurement procedure according to an embodiment of the present invention.

FIG. 9 is a schematic view illustrating a discovery signal-based measurement procedure according to an embodiment of the present invention.

FIG. 9 illustrates a method in which a macrocell 950 or master small cell managing a small cell 900 instructs the small cell 900 to start or end a discovery signal-based measurement procedure.

A discovery signal-based measurement procedure may be needed only when topology of a network is changed. When there is no change in the topology of the network, continuously performing the discovery signal-based measurement procedure by small cells 900 operating in the network may unnecessarily increase processing complexity of the small cells 900 and cause energy consumption of the small cells 900.

Thus, the discovery signal-based measurement procedure may be configured to start when the small cell 900 receives a measurement procedure related message 910 instructing start of the discovery signal-based measurement procedure from the macrocell 950 or master small cell through a backhaul.

The measurement procedure related message 910 may include information on a time period for the small cell 900 to detect the discovery signal 920 and information on a condition for the small cell 900 to end detection of the discovery signal 920.

For example, the small cell 900 may detect the discovery signal 920 only during a particular time period configured based on the information on the time period (detection time information) for the small cell 900 to detect the discovery signal 920 included in the measurement procedure related message 910. Alternatively, the small cell 900 may end detection of the discovery signal 920 when a particular condition is satisfied based on the information on the condition (detection end condition information) for the small cell 900 to end detection of the discovery signal 920 included in the measurement procedure related message 910.

Alternatively, the detection time information and detection end condition information may be transmitted to the small cell through a separate message other than the measurement procedure related message. In addition, the detection time information and detection end condition information may be configured in advance in the small cell. In this case, the measurement procedure related message may not separately be transmitted to the small cell.

Alternatively, a measurement procedure end message as a separate message transmitted from the macrocell or master small cell may instruct the small cell to end detection of the discovery signal. When the measurement procedure end message is received, the small cell may suspend an operation of detecting the discovery signal.

Starting and ending detection of a discovery signal may be performed by a cell group, not by a cell. For instance, when transmission and reception of a discovery signal is performed by a cell group, starting and ending detection of the discovery signal may be performed by a cell group. A measurement procedure related message may include ID information on a cell group transmitting the discovery signal detected by a small cell. The small cell receiving the measurement procedure related message may detect discovery signals transmitted by a plurality of cells included in the cell group corresponding to the ID information on the cell group. Likewise, a measurement procedure end message may include ID information on a cell group transmitting a discovery signal of which detection is ended. The small cell receiving the measurement procedure related message may end detection of the discovery signals transmitted by the plurality of cells included in the cell group corresponding to the cell group ID.

Figure 10:
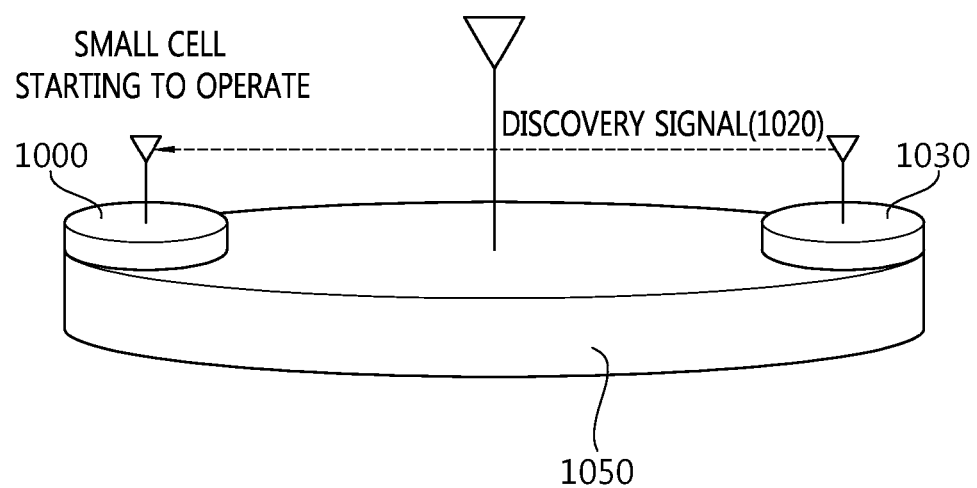
FIG. 10 is a schematic view illustrating a discovery signal-based measurement procedure according to an embodiment of the present invention.

FIG. 10 is a schematic view illustrating a discovery signal-based measurement procedure according to an embodiment of the present invention.

FIG. 10 illustrates a method in which a small cell 1000 starting to operate performs a discovery signal-based measurement procedure.

When the small cell 1000 starts to operate in a network, topology of the network may change. Thus, when the small cell 1000 starts to operate, the small cell 1000 may detect a discovery signal 1020 transmitted by a neighbor cell 1030 in a predetermined time period as a default.

The time period in which the small cell 1000 detects the discovery signal 1020 may not be configured as a default. A macrocell 1050 or master small cell may transmit information on the time period in which the small cell 1000 detects the discovery signal 1020 to the small cell 1000 through a backhaul. The small cell 1000 may detect the discovery signal 1020 during the configured time period for detecting the discovery signal. The information on the time period for detecting the discovery signal 1020 may be transmitted to the small cell through an X2 interface.

A UE may detect the discovery signal 1020 only in a time of some subframes included in the configured time period for detecting the discovery signal 1020 or in part of the time period.

FIGS. 9 and 10 illustrate methods in which a small cell detects a discovery signal transmitted by a neighbor cell.

On the contrary, a small cell may transmit a discovery signal for a discovery signal-based measurement procedure of a neighbor cell. When there is no change in the topology of the network, continuously transmitting a discovery signal by the small cell may unnecessarily increase network complexity and cause energy consumption of a UE.

An embodiment of the present invention illustrates an operation that each small cell or each small cell group transmits a discovery signal for a discovery signal-based measurement procedure of a neighbor cell.

Figure 11:
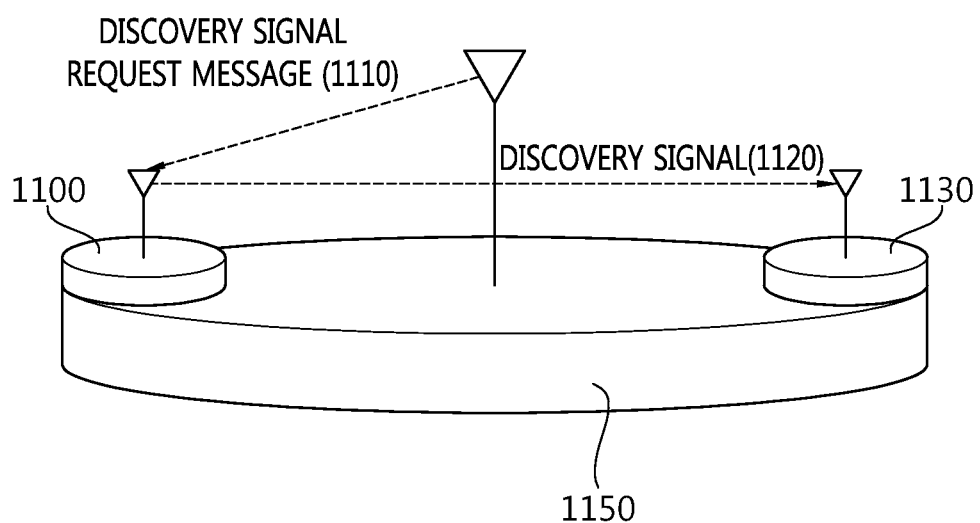
FIG. 11 is a schematic view illustrating a procedure of transmitting a discovery signal according to an embodiment of the present invention.

FIG. 11 is a schematic view illustrating a procedure of transmitting a discovery signal according to an embodiment of the present invention.

FIG. 11 illustrates a method in which a macrocell 1150 or master small cell managing a small cell 1100 transmits a discovery signal of the small cell 1100.

Referring to FIG. 11, when the small cell 1100 starts to operate in a network, the macrocell 1150 or master small cell managing the small cell 1100 may instruct the small cell 1100, which starts to operate, to transmit a discovery signal 1120. Further, the macrocell 1150 or master small cell may also instruct a neighbor cell 1130 to transmit a discovery signal 1120 so that the small cell 1100 starting to operate performs a discovery signal-based measurement procedure based on the discovery signal 1120 received from the neighbor cell 1130. A message instructing the small cell 1100 to transmit the discovery signal 1120 may be represented as a term "discovery signal request message" 1110.

The discovery signal request message 1110 may be transmitted to the small cell through a backhaul. The small cell 1100 receiving the discovery signal request message 1110 may transmit the discovery signal 1120. The discovery signal request message 1110 may include information on a time period for transmitting the discovery signal 1120 and information related to end of transmission of the discovery signal 1120 (for example, a condition for ending transmission of the discovery signal 1120). The small cell 1100 receiving the discovery signal request message 1110 including such information may transmit the discovery signal 1120 during a time period determined based on the information on the time period for transmitting the discovery signal 1120. Further, the small cell 1100 may end transmission of the discovery signal 1120 based on the information related to the end of transmission of the discovery signal 1120.

The information on the time period for transmitting the discovery signal 1120 and information related to the end of transmission of the discovery signal 1120 may be transmitted to the small cell 1100 through a different message, instead of the discovery signal request message 1110. Alternatively, the information on the time period for transmitting the discovery signal 1120 and information related to the end of transmission of the discovery signal 1120 may be preset in the small cell 1100, and the small cell 1100 may transmit the discovery signal 1120 and end transmission of the discovery signal 1120 based on the preset information.

Ending transmission of the discovery signal 1120 may be instructed separately by the macrocell 1150 or master small cell.

The small cell 1100 may suspend transmission of the discovery signal 1120 when a discovery signal end message instructing end of transmission of the discovery signal 1120 is received from the macrocell 1150 or master small cell.

Starting and ending transmission of the discovery signal illustrated in FIG. 11 may be performed by a particular cell and also by a particle cell group. For example, a discovery signal request message may include cell group ID information indicating a cell group to transmit a discovery signal. The cell group indicated by the discovery signal request message may transmit a discovery signal. Likewise, a discovery signal end message may include cell group ID information indicating a cell group to end transmission of a discovery signal. The cell group indicated by the discovery signal end message may end transmission of a discovery signal.

Figure 12:
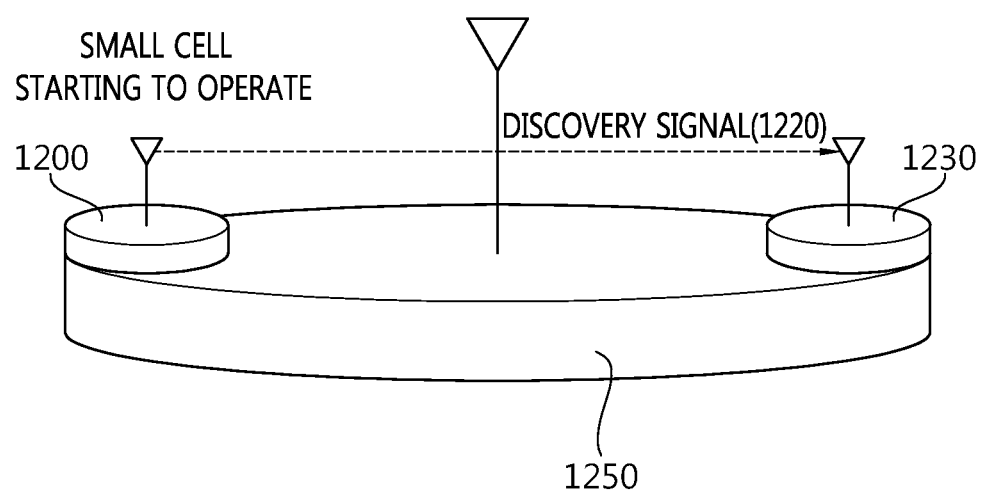
FIG. 12 is a schematic view illustrating a procedure of transmitting a discovery signal according to an embodiment of the present invention.

FIG. 12 is a schematic view illustrating a procedure of transmitting a discovery signal according to an embodiment of the present invention.

FIG. 12 illustrates a method that a small cell 1200 which starts to operate transmits a discovery signal 1220.

The small cell 1200 starting to operate may mean that the small cell 1200 starts communications through a backhaul, that the small cell 1200 initiates transmission power and/or reception power or that the small cell 1200 suspends transmission and reception for a certain time and resumes transmission and reception.

Referring to FIG. 12, when the small cell 1200 starts to operate in a network, topology of the network may be changed. When starting to operate, the small cell 1200 may transmit a discovery signal 1220 in a time period predetermined as a default value. Alternatively, when the small cell 1200 starts to operate, a macrocell 1250 or master small cell managing the small cell 1200 may transmit a discovery signal request message through the backhaul. The small cell 1200 may transmit the discovery signal during a time period set based on the received discovery signal request message. The small cell 1200 may transmit the discovery signal 1220 only in a time of some subframes included in the time period configured for transmitting the discovery signal or in part of the time period. The discovery signal request message may be transmitted to the small cell through an X2 interface.

Hereinafter, an embodiment of the present invention illustrates alignment of a timing when a small cell transmits a discovery signal and a timing when a small detects a discovery signal.

Small cells operating in frequency division duplex (FDD) may perform DL transmission to transmit DL data at a first frequency (f1) and receive UL data transmitted from a UE at a second frequency (f2).

When a first small cell transmits a discovery signal at the first frequency, a second small cell receives the discovery signal from the first small cell at the first frequency. The second small cell may also transmit DL data to a UE at the first frequency. The second small cell performs an operation of receiving the discovery signal at the first frequency and an operation of transmitting DL data to the UE at the first frequency. These operations are operations of transmitting and receiving data at the same frequency at the same time and may have physical difficulty. Thus, it is necessary to align timings for a small cell to transmit and receive a discovery signal.

Hereinafter, an embodiment of the present invention illustrates a method of configuring a time resource for transmitting a discovery signal and a time resource for receiving a discovery signal in a DL frequency band or UL frequency band.

Figure 13:
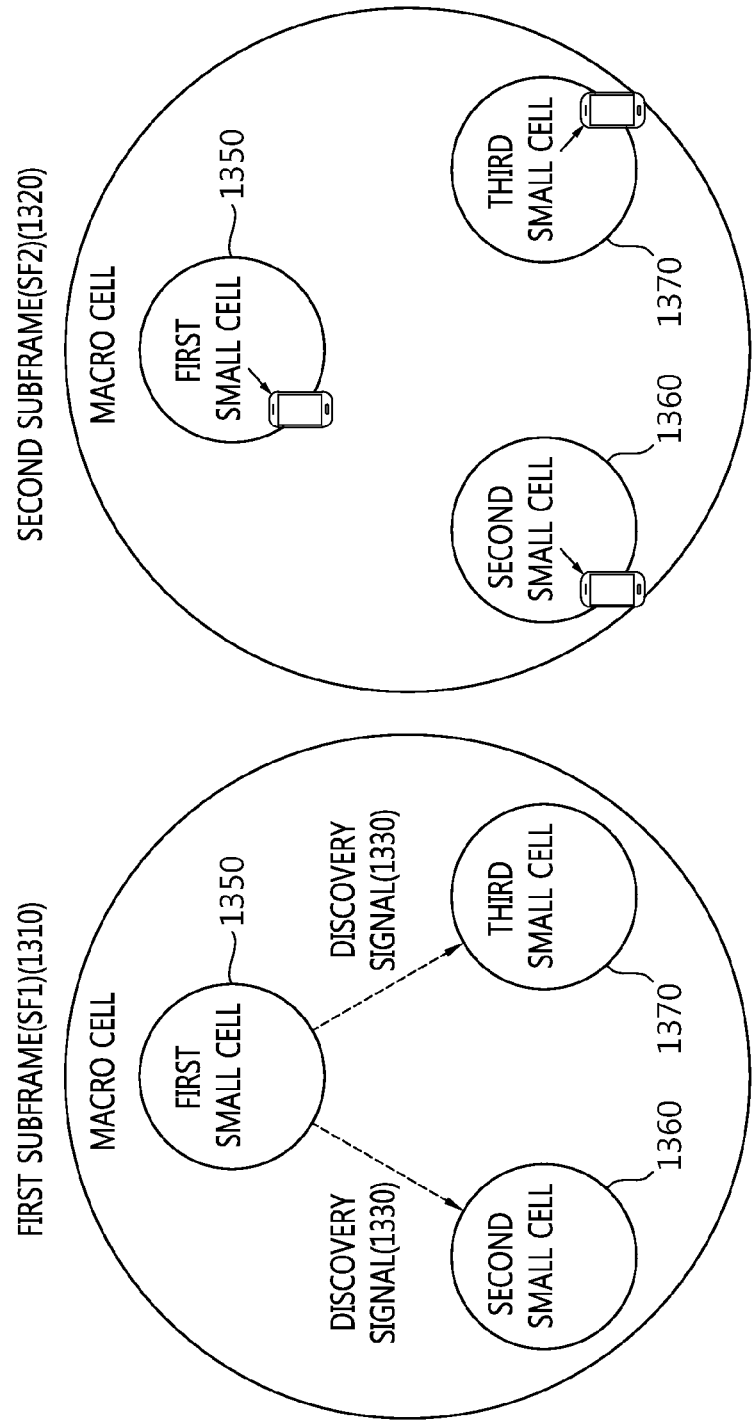
FIG. 13 is a schematic view illustrating a time resource scheduling method of a small cell according to an embodiment of the present invention.

FIG. 13 is a schematic view illustrating a time resource scheduling method of a small cell according to an embodiment of the present invention.

FIG. 13 illustrates a method in which a small cell transmits or receives a discovery signal or transmits DL data through a frequency resource configured as a DL frequency band in an FDD-based LTE system. For convenience of description, a frequency band for transmitting or receiving a discovery signal or transmitting DL data may be referred to as a DL frequency band, through which a small cell may receive a discovery signal.

In detail, a time resource of the small cell may be divided into a time resource for transmitting a discovery signal to a neighbor cell through the DL frequency band, a time resource for receiving a discovery signal from a neighbor cell through the DL frequency band and a time resource for transmitting DL data to a UE through the DL frequency band.

For convenience of description, the time resource of the small cell may be classified into a discovery signal transmission subframe (DS) for transmitting a discovery signal by a subframe, a discovery signal reception subframe (RX) for receiving a discovery signal and a DL subframe (DL) for not performing transmission and reception of a discovery signal but performing DL transmission to a UE. The discovery signal reception subframe for receiving a discovery signal may indicate a time resource for detecting a discovery signal.

A configuration of a discovery signal reception subframe, a discovery signal transmission subframe and a DL subframe of a particular small cell may have a subordinate relationship with a configuration of a discovery signal reception subframe, a discovery signal transmission subframe and a DL transmission subframe of a neighbor cell.

Table 1 below illustrates configurations of discovery signal reception subframes, discovery signal transmission subframes and DL subframes of a plurality of small cells. Information on the configurations of the discovery signal reception subframes, the discovery signal transmission subframes and the DL subframes of the plurality of small cells may be referred to as discovery signal subframe configuration information.

TABLE 1

| | SF1 | SF2 | SF3 | SF4 | SF5 | SF6 | SF7 | SF8 | SF9 | SF10 | SF11 | SF12 |
|---|---|---|---|---|---|---|---|---|---|---|---|---|
| Cell 1 | DS | DL | DL | DL | RX | DL | DL | DL | RX | DL | DL | DL |
| Cell 2 | RX | DL | DL | DL | DS | DL | DL | DL | RX | DL | DL | DL |
| Cell 3 | RX | DL | DL | DL | RX | DL | DL | DL | DS | DL | DL | DL |

Referring to Table 1 and FIG. 13, subframe configurations of three small cells (first small cell (cell 1) 1350, second small cell (cell 2) 1360 and third small cell (cell 3) 1370) are illustrated. A first subframe SF1 1310 may be configured for the first small cell 1350 as a discovery signal transmission subframe DS for transmitting a discovery signal 1330 and for the second small cell 1360 and the third small cell 1370 as a discovery signal reception subframe RX for detecting the discovery signal 1330. That is, the first small cell 1350 transmits the discovery signal through the discovery signal transmission subframe, and the second small cell 1360 and the third small cell 1370 may detect and receive the discovery signal 1330 transmitted from the first small cell 1350 through the discovery signal reception subframe.

A second subframe SF2 1320 to a fourth subframe SF4 may be configured as DL subframes DL for transmitting DL data to a UE for all of the first small cell 1350, the second small cell 1360 and the third small cell 1370.

A fifth subframe SF5 may be configured for the second small cell as a discovery signal transmission subframe for transmitting a discovery signal and for the first small cell and the third small cell as a discovery signal reception subframe for receiving a discovery signal.

In subframes configured as a discovery signal transmission subframe or discovery signal reception subframe, such as the first subframe 1310 and the fifth subframe, transmission of DL data (a CRS, PDSCH data, or the like) transmitted from a small cell to a UE may be suspended or postponed.

When a subframe of a small cell is configured as a discovery signal transmission subframe or discovery signal reception subframe, a UE may not expect to receive DL data. The UE may not expect to receive DL data in a subframe-unit resource or limitedly in a resource scheduled for a discovery signal.

Figure 14:
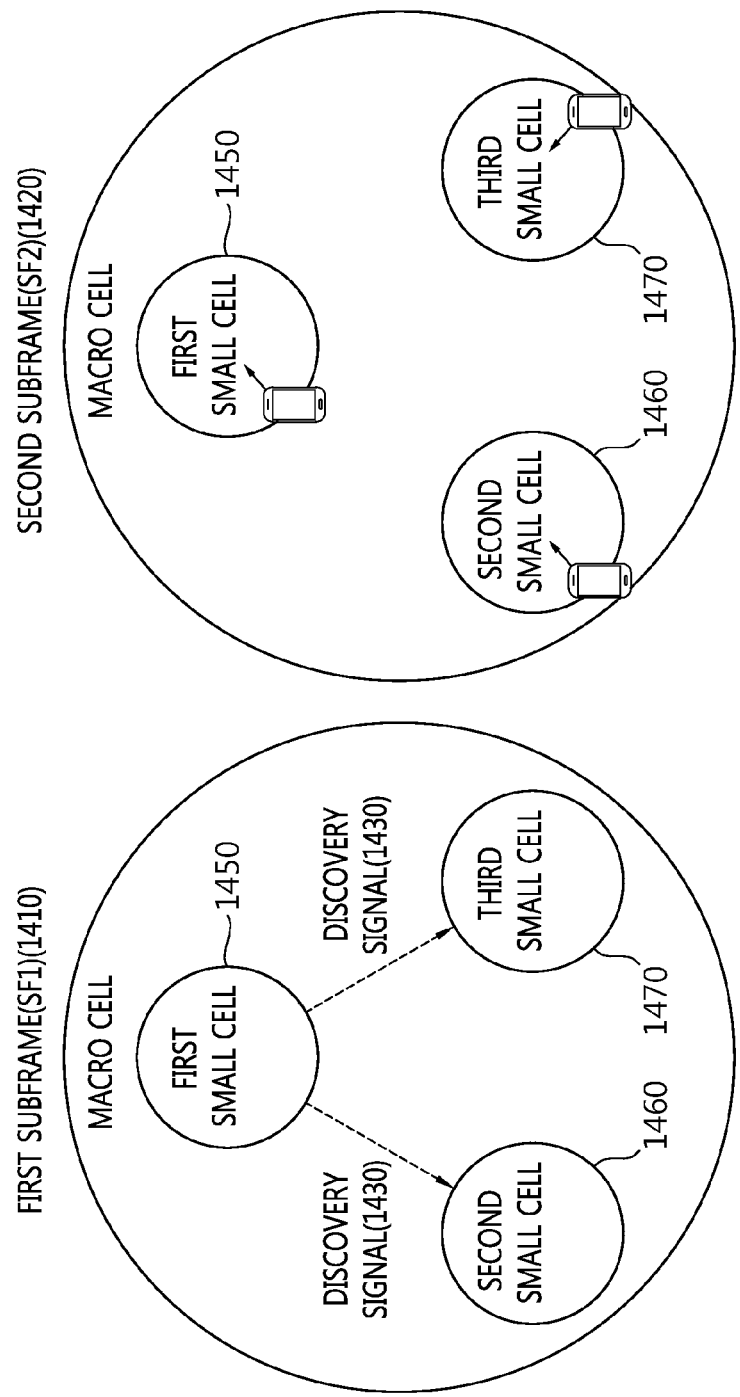
FIG. 14 is a schematic view illustrating a time resource scheduling method of a small cell according to an embodiment of the present invention.

FIG. 14 is a schematic view illustrating a time resource scheduling method of a small cell according to an embodiment of the present invention.

FIG. 14 illustrates a method in which a small cell transmits or receives a discovery signal or receives UL data from a UE through a frequency resource configured as a UL frequency band in an FDD-based LTE system. For convenience of description, a frequency band for transmitting or receiving a discovery signal or receiving UL data may be referred to as a UL frequency band, through which a small cell may transmit a discovery signal.

In detail, a time resource of the small cell may be divided into a time resource for transmitting a discovery signal to a neighbor cell through the UL frequency band, a time resource for receiving a discovery signal from a neighbor cell through the UL frequency band and a time resource for receiving UL data from a UE through the UL frequency band.

For convenience of description, the time resource may be classified by a subframe and into a discovery signal transmission subframe for transmitting a discovery signal, a discovery signal reception subframe for receiving a discovery signal and a UL reception subframe for not performing transmission and reception of a discovery signal but receiving UL data from a UE. The discovery signal reception subframe for receiving a discovery signal may be a time resource for detecting a discovery signal.

A configuration of a discovery signal reception subframe, a discovery signal transmission subframe and a UL reception subframe of a particular small cell may be determined depending on a configuration of a discovery signal reception subframe, a discovery signal transmission subframe and a UL subframe of a neighbor cell.

Table 2 below illustrates configurations of discovery signal reception subframes, discovery signal transmission subframes and UL subframes of a plurality of small cells. Information on the configurations of the discovery signal reception subframes, the discovery signal transmission subframes and the UL subframes of the plurality of small cells may be referred to as discovery signal subframe configuration information.

TABLE 2

|        | SF1 | SF2 | SF3 | SF4 | SF5 | SF6 | SF7 | SF8 | SF9 | SF10 | SF11 | SF12 |
|--------|-----|-----|-----|-----|-----|-----|-----|-----|-----|------|------|------|
| Cell 1 | DS  | UL  | UL  | UL  | RX  | UL  | UL  | UL  | RX  | UL   | UL   | UL   |
| Cell 2 | RX  | UL  | UL  | UL  | DS  | UL  | UL  | UL  | RX  | UL   | UL   | UL   |
| Cell 3 | RX  | UL  | UL  | UL  | RX  | UL  | UL  | UL  | DS  | UL   | UL   | UL   |

Referring to Table 2 and FIG. 13, discovery signal subframe configuration information on three small cells (first small cell (cell 1) 1450, second small cell (cell 2) 1460 and third small cell (cell 3) 1470) is illustrated. A first subframe SF1 1410 may be configured for the first small cell 1450 as a discovery signal transmission subframe DS for transmitting a discovery signal 1430 and for the second small cell 1460 and the third small cell 1470 as a discovery signal reception subframe RX for receiving the discovery signal 1430. That is, in the first subframe 1410, the first small cell 1450 transmits the discovery signal 1430, and the second small cell 1460 and the third small cell 1470 may detect and receive the discovery signal 1430 transmitted from the first small cell 1450.

A second subframe SF2 1420 to a fourth subframe SF4 may be configured as UL subframes UL for receiving UL data from a UE for all of the first small cell 1450, the second small cell 1460 and the third small cell 1470.

A fifth subframe may be configured for the second small cell as a discovery signal transmission subframe for transmitting a discovery signal and for the first small cell and the third small cell as a discovery signal reception subframe for receiving a discovery signal.

In a discovery signal transmission subframe or discovery signal reception subframe, such as the first subframe 1410 and the fifth subframe, a small cell may suspend or postpone receiving UL data (for example, PUSCH data) transmitted from a UE. Likewise, the UE may suspend transmitting UL data transmitted to the small cell in a subframe configured as a discovery signal transmission subframe or discovery signal reception subframe. Also, the UE may not expect a resource to be scheduled for UL transmission in the subframe configured as the discovery signal transmission subframe or discovery signal reception subframe.

The UE may not transmit UL data and not expect scheduling of a UL resource in each subframe (discovery signal transmission subframe or discovery signal reception subframe). Alternatively, the UE may not transmit UL data and not expect scheduling of a UL resource only in some time resources and frequency resources of a subframe allocated for a discovery signal.

The time resource division modes illustrated in FIGS. 13 and 14 may also be used when a duplexing mode is TDD, in addition to FDD.

In a TDD-based LET system, some subframes configured as DL subframes or UL subframes may be configured as separate discovery signal transmission subframes or discovery signal reception subframes. In one specific embodiment, it may be assumed that a particular subframe corresponding to a particular time is configured as a DL subframe in a first small cell, a second small cell and a third small cell. One of the first small cell, the second small cell and the third small cell may configure the DL subframe corresponding to the particular time as a discovery signal transmission subframe, and the other small cells may configure the DL subframe corresponding to the particular as a discovery signal reception subframe. A remaining subframe not configured as a discovery signal transmission subframe or discovery signal reception subframe may be configured as a UL subframe or DL subframe as in the existing TDD mode.

In another embodiment, it may be assumed that a particular subframe corresponding to a particular time is configured as a UL subframe in a first small cell, a second small cell and a third small cell. One of the first small cell, the second small cell and the third small cell may configure the UL subframe corresponding to the particular time as a discovery signal transmission subframe, and the other small cells may configure the UL subframe corresponding to the particular time as a discovery signal reception subframe. A subframe not configured as a discovery signal transmission subframe or discovery signal reception subframe may be configured as a UL subframe or DL subframe as in the existing TDD mode.

In still another embodiment, one of the first small cell, the second small cell and the third small cell may configure a subframe configured as a DL subframe as a discovery signal transmission subframe, and at least one of the other small cells may configure a subframe configured as a UL subframe as a discovery signal reception subframe. The UL subframe configured as the discovery signal reception subframe may temporally correspond to the subframe configured as the DL subframe.

Figure 15:
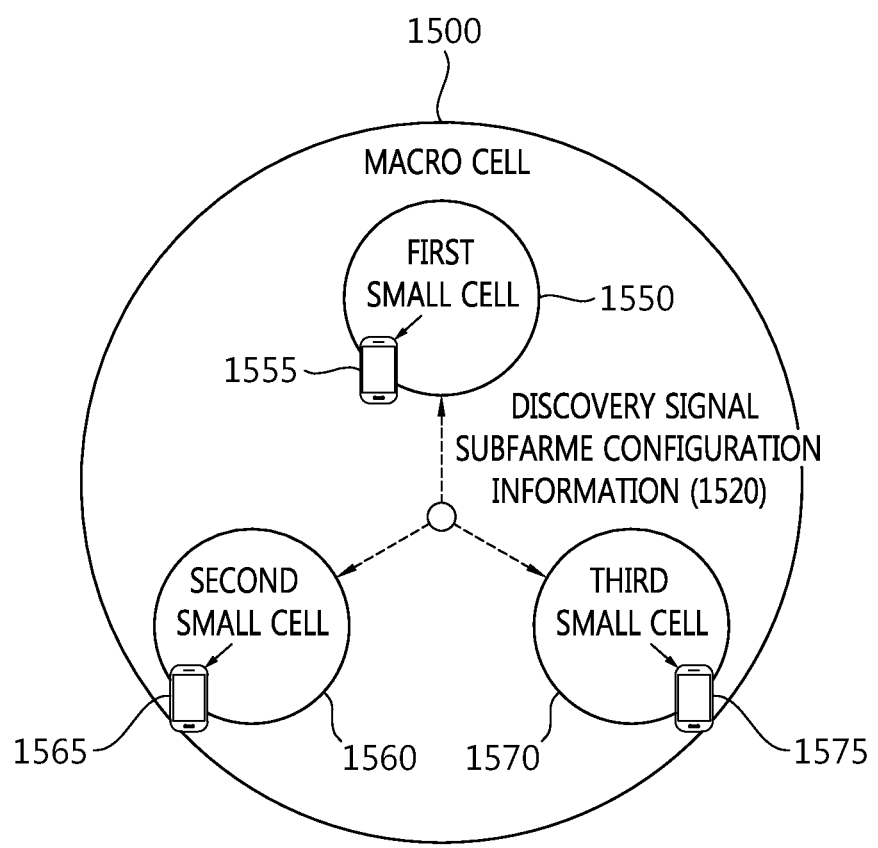
FIG. 15 is a schematic view illustrating a method of transmitting discovery signal subframe configuration information according to an embodiment of the present invention.

FIG. 15 is a schematic view illustrating a method of transmitting discovery signal subframe configuration information according to an embodiment of the present invention.

FIG. 15 illustrates a method in which a macrocell 1500 or master small cell transmits discovery signal subframe configuration information 1520 to small cells 1550, 1560 and 1570.

For instance, the macrocell 1500 or master small cell may transmit the discovery signal subframe configuration information 1520 to the small cells 1550, 1560 and 1570. The discovery signal subframe configuration information 1520 may be transmitted through a backhaul from the macrocell 1500 or master small cell to the small cells 1550, 1560 and 1570. Further, the macrocell 1500 or master small cell may transmit information (a discovery signal sequence, an ID of a cell transmitting a discovery signal, or the like) on a discovery signal to be transmitted by the small cells 1550, 1560 and 1570 to the small cells 1550, 1560 and 1570.

The discovery signal subframe configuration information 1520 may also be transmitted from the small cells 1550, 1560 and 1570 to UEs 1555, 1565 and 1575. The UEs 1555, 1565 and 1575 may not transmit a UL subframe in a particular subframe and not expect scheduling of a resource for UL transmission based on the received discovery signal subframe configuration information 1520. Alternatively, the UEs 1555, 1565 and 1575 may not expect DL transmission from the small cells 1550, 1560 and 1570 based on the received discovery signal subframe configuration information 1520.

The foregoing operations of transmitting and receiving the discovery signal may be performed not by each small cell but by a plurality of small cells as a unit, that is, by a cell group unit.

Figure 16:
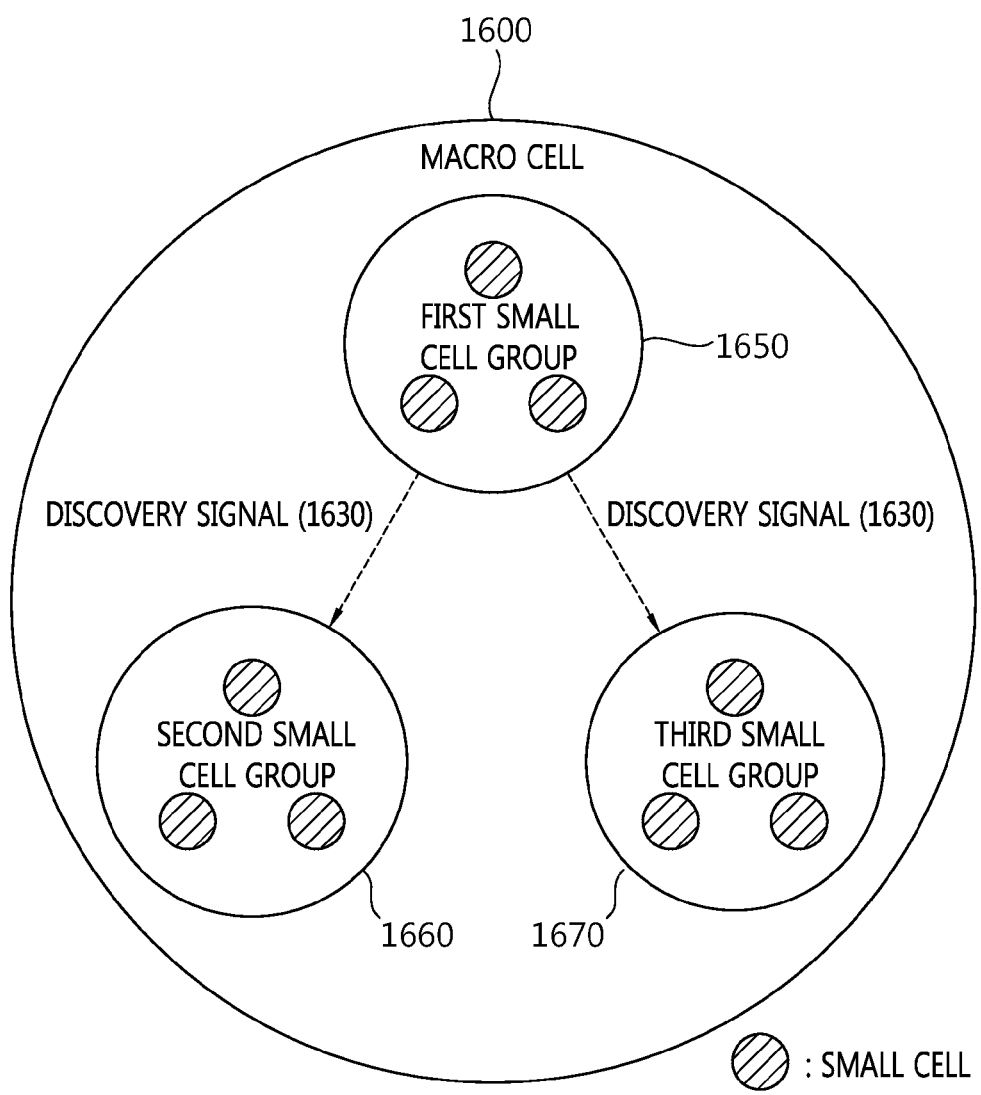
FIG. 16 is a schematic view illustrating an operation of transmitting and receiving a discovery signal by each small cell group according to an embodiment of the present invention.

FIG. 16 is a schematic view illustrating an operation of transmitting and receiving a discovery signal by each small cell group according to an embodiment of the present invention.

Referring to FIG. 16, small cells may be divided into a plurality of small cell groups 1650, 1660 and 1670, and a discovery signal subframe configuration may be determined for each small cell group.

Each group may perform the operations described above in FIGS. 13 and 14. For example, the plurality of small cells may be grouped into a first small cell group 1650, a second small cell group 1660 and a third small cell group 1670. A discovery signal transmission subframe and a discovery signal reception subframe may be configured for each small cell group. For example, when the first small cell group 1650 configures a subframe corresponding to a particular time as a discovery signal transmission subframe to transmit a discovery signal 1630, the second small cell group 1660 and the third small cell group 1670 may configure the subframe corresponding to the particular time as a discovery signal reception subframe.

A small cell group may identify topology of a network of small cells included in the small cell group. Thus, the small cell group may not configure a separate particular subframe as a discovery signal transmission subframe or discovery signal reception subframe. Alternatively, small cells included in a small cell group may also configure a particular subframe as a discovery signal transmission subframe or discovery signal reception subframe to perform a procedure of transmitting and receiving a discovery signal between the small cells included in the small cell.

The small cells may be grouped by different methods. For example, the small cells may receive information a small cell group to which the small cells are to belong based on signaling through a backhaul. The macrocell or master small cell may transmit the information on the small cell group to the small cells through backhaul signaling. Alternatively, the small cells may be grouped based on discovery signals transmitted from the small cells. For example, the small cells may be grouped according to IDs of the discovery signals transmitted by the small cells, a sequence of the discovery signals and time/frequency resources for the discovery signals. Alternatively, the information on the small cell group to which the small cells are to belong may be configured based on cell ID information on the small cells.

Discovery signal subframe configuration information configured for a small cell or small cell group may be changed. That is, configurations of discovery signal transmission subframes and/or discovery signal reception subframes included in the discovery signal subframe configuration information may be changed. For instance, the configurations of the discovery signal transmission subframes and/or discovery signal reception subframes may be changed over time according to predetermined rules. Such a change over time in the configurations of the discovery signal transmission subframes and/or discovery signal reception subframes may be determined based on a cell ID of a small cell, an ID of a discovery signal allocated to a small cell, and time/frequency resources allocated for a discovery signal.

Transmission and reception of a discovery signal between small cells or between small cell groups described above may also be applied that between a small cell and a macrocell.

Hereinafter, an embodiment of the present invention illustrates transmission and reception of a discovery signal between a small cell and a macrocell.

Figure 17:
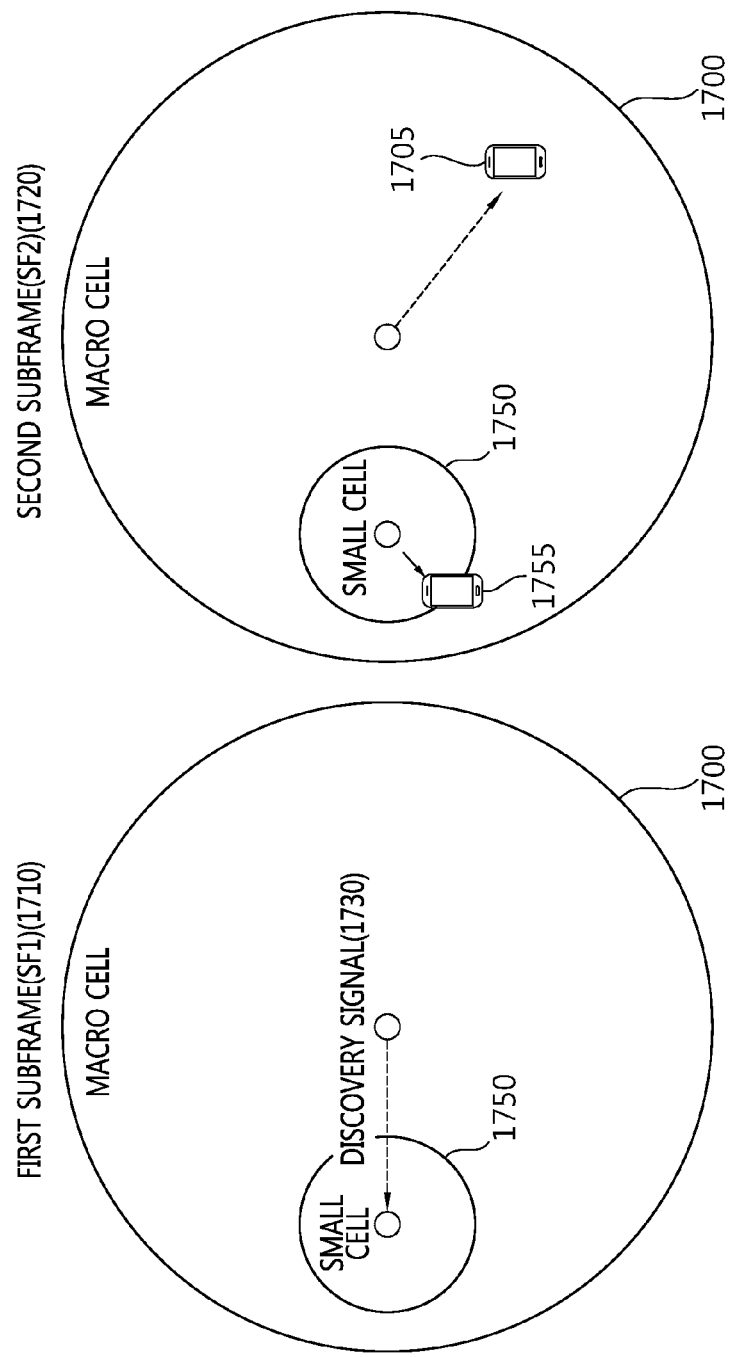
FIG. 17 is a schematic view illustrating transmission and reception of a discovery signal between a small cell and a macrocell according to an embodiment of the present invention.

FIG. 17 is a schematic view illustrating transmission and reception of a discovery signal between a small cell and a macrocell according to an embodiment of the present invention.

In FIG. 17, a macrocell transmits a discovery signal and a small cell detects the discovery signal, thereby determining approximate location information in a macro-region on a plurality of small cells included in coverage of the macrocell and/or interference information on the plurality of small cells in the macro-region. Further, the macrocell transmits the discovery signal and the small cell detects the discovery signal, thereby determining location information on the macrocell and the small cell and/or interference information between the macrocell and the small cell.

A discovery signal transmission subframe and a discovery signal reception subframe may be configured between the macrocell and the small cell to transmit and receive a discovery signal. Discovery signal subframe configuration information may be transmitted from the macrocell to the small cell. As illustrated below in Table 3, discovery signal subframes may be configured between the macrocell and the small cell.

TABLE 3

|  | SF1 | SF2 | SF3 | SF4 | SF5 | SF6 | SF7 | SF8 | SF9 | SF10 | SF11 | SF12 |
|---|---|---|---|---|---|---|---|---|---|---|---|---|
| Macro Cell | DS | DL | DL | DL | DL | DL | DL | DL | DS | DL | DL | DL |
| Small Cell | RX | DL | DL | DL | DL | DL | DL | DL | RX | DL | DL | DL |

Referring to Table 3 and FIG. 17, a configuration of discovery signal subframes in a DL frequency band is illustrated. The macrocell 1700 may configure a first subframe SF1 1710 and a ninth subframe SF9 as discovery signal transmission subframes. The macrocell may transmit a discovery signal 1730 through the first subframe SF1 1710 and the ninth subframe SF9. The macrocell 1700 may configure the first subframe SF1 1710 and the ninth subframe SF9 of the small cell 1750 as discovery signal reception subframes. Through the first subframe and the ninth subframe, the macrocell may transmit the discovery signal and the small cell may receive the discovery signal transmitted by the macrocell. Remaining subframes may be configured as DL subframes for DL data transmission. For example, the macrocell 1700 and the small cell 1750 may perform DL transmission to respective UEs 1705 and 1755 through a second subframe SF2 1720.

In another embodiment, as illustrated below in Table 4, discovery signal subframes may be configured between the macrocell and the small cell.

TABLE 4

|  | SF1 | SF2 | SF3 | SF4 | SF5 | SF6 | SF7 | SF8 | SF9 | SF10 | SF11 | SF12 |
|---|---|---|---|---|---|---|---|---|---|---|---|---|
| Macro Cell | DS | UL | UL | UL | UL | UL | UL | UL | DS | UL | UL | UL |
| Small Cell | RX | UL | UL | UL | UL | UL | UL | UL | RX | UL | UL | UL |

Table 4 illustrate a configuration of subframes in a UL frequency band. The macrocell may configure the first subframe SF1 and the ninth subframe SF9 as discovery signal transmission subframes. The macrocell may configure the first subframe SF1 and the ninth subframe SF9 as discovery signal reception subframes. Remaining subframe may be configured as UL subframes for UL data transmission.

The small cell may not only detect the discovery signal transmitted from the macrocell in the discovery signal reception subframes according to the discovery signal subframe configuration information but also discover the discovery signal when the small cell starts to operate.

According to still another embodiment, the small cell and the macrocell may operate in different frequency bands. When the small cell and the macrocell may operate in different frequency bands, monitoring, by the small cell, a transmission frequency band of the macrocell to receive the discovery signal transmitted by the macrocell may increase complexity of the small cell.

Figure 18:
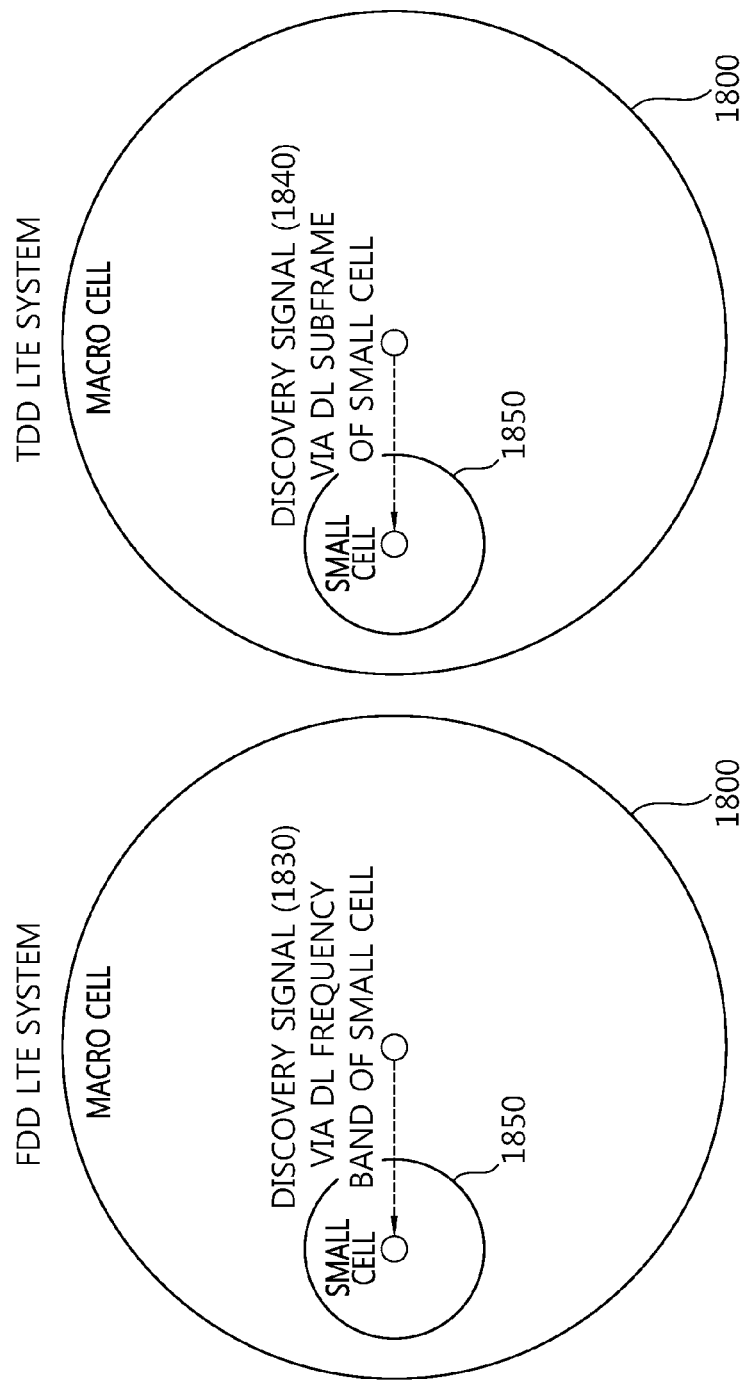
FIG. 18 is a schematic view illustrating transmission and reception of a discovery signal between a small cell and a macrocell according to an embodiment of the present invention.
Figure 19:
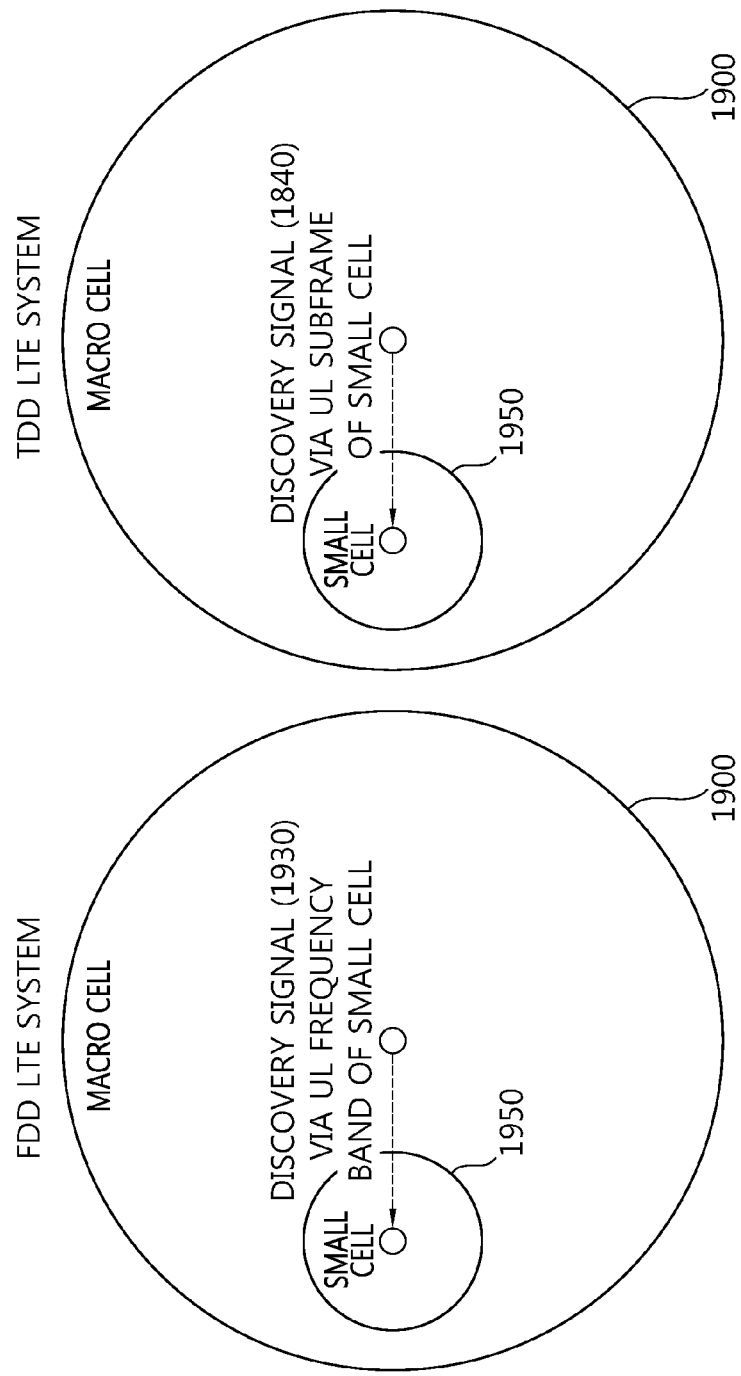
FIG. 19 is a schematic view illustrating transmission and reception of a discovery signal between a small cell and a macrocell according to an embodiment of the present invention.

Hereinafter, FIGS. 18 and 19 illustrate a method of transmitting and receiving a discovery signal between a small cell and a macrocell when the small cell and the macrocell operate in different frequency bands.

FIG. 18 is a schematic view illustrating transmission and reception of a discovery signal between a small cell and a macrocell according to an embodiment of the present invention.

A macrocell may transmit a discovery signal through a DL frequency band or DL subframe of a small cell.

Specifically, referring to a left part of FIG. 18, in an FDD-based LTE system, a macrocell 1800 may configure a particular subframe in a DL frequency band of a small cell 1850 as a discovery signal reception subframe to transmit a discovery signal 1830. The small cell 1850 may receive the discovery signal 1830 transmitted from the macrocell 1800 in the discovery signal reception subframe.

Alternatively, referring to a right part of FIG. 18, in a TDD-based LTE system, a macrocell 1800 may configure, as a discovery signal reception subframe, at least one of subframes configured as DL subframes to transmit a discovery signal 1840. A small cell 1850 may receive the discovery signal 1840, transmitted from the macrocell 1800, in the discovery signal reception subframe.

The small cell may detect and receive the discovery signal transmitted by the macrocell. The small cell may suspend transmission of DL data (a CRS, PDSCH, or the like) to a UE in the discovery signal reception subframe in which the discovery signal is received. Configuration information on the discovery signal reception subframe may be transmitted to the UE, and the UE may not expect to receive DL data in the discovery signal reception subframe.

FIG. 19 is a schematic view illustrating transmission and reception of a discovery signal between a small cell and a macrocell according to an embodiment of the present invention.

A macrocell may transmit a discovery signal through a UL frequency band or UL subframe of a small cell.

Specifically, referring to a left part of FIG. 19, in an FDD-based LTE system, a macrocell 1900 may configure a particular subframe in a UL frequency band of a small cell 1950 as a discovery signal reception subframe to transmit a discovery signal 1930. The small cell 1950 may receive the discovery signal 1930 transmitted from the macrocell 1900 in the discovery signal reception subframe.

Alternatively, referring to a right part of FIG. 19, in a TDD-based LTE system, a macrocell 1900 may configure, as a discovery signal reception subframe, at least one of subframes configured as UL subframes to transmit a discovery signal 1940. A small cell 1950 may receive the discovery signal 1940, transmitted from the macrocell 1900, in the discovery signal reception subframe.

The small cell may detect and receive the discovery signal transmitted by the macrocell in this manner. The small cell may suspend or postpone transmission of UL data transmitted from a UE in the discovery signal reception subframe in which the discovery signal is received. Configuration information on the discovery signal reception subframe may be transmitted to the UE, and the UE may not transmit UL data and not expect to be allocated a resource for transmitting UL data in the discovery signal reception subframe.

Figure 20:
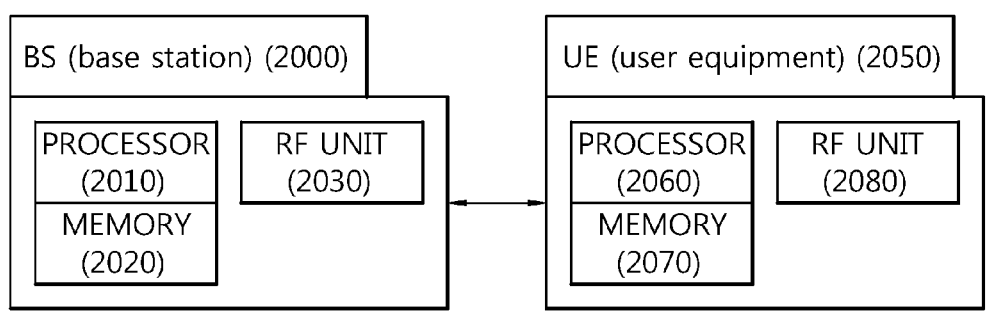
FIG. 20 is a block diagram illustrating a wireless communication system according to an embodiment of the present invention.

FIG. 20 is a block diagram showing a wireless communication system according to an embodiment of the present invention.

Referring to FIG. 20, a BS 2000 includes a processor 2010, a memory 2020 and a RF unit 2030. The memory 2020 is connected to the processor 2010 and configured to store various information used for the operations for the processor 2010. The RF unit 2030 is connected to the processor 2010 and configured to transmit and/or receive a radio signal. The processor 2010 implements the proposed functions, processed, and/or methods. In the described embodiments, the operation of BS may be implemented by the processor 2010.

For example, the processor 2010 may be configured to receive first discovering resource configuration information from a master cell and to receive a discovery signal from at least one discovering target cell based on the first discovering resource configuration information. The first discovering resource configuration information may include information indicating a first time resource for a discovering cell to receive a discovery signal through a first frequency band and information indicating a second time resource for the discovering cell to transmit DL data to a UE through the first frequency band.

A wireless apparatus 2050 includes a processor 2060, a memory 2070, and a radio frequency (RF) unit 2080. The memory 2070 is connected to the processor 2060 and configured to store various information used for operating the processor 2060. The RF unit 2080 is connected to the processor 2060 and configured to transmit and/or receive a radio signal. The processor 2060 implements the proposed functions, processed, and/or methods. In the embodiments described above, the operation of the wireless apparatus may be implemented by the processor 2060.

For example, the processor 2060 may receive the first discovering resource configuration information from the discovering cell. The first discovering resource configuration information may further include information on a third time resource for the discovering cell to transmit a discovery signal. The processor 2060 may be configured not to expect transmission of DL data through the first time resource for receiving a discovery signal from the base station and the third time resource for transmitting a discovery signal.

The processor may include application-specific integrated circuits (ASICs), other chipsets, logic circuits, and/or data processors. The memory may include read-only memory (ROM), random access memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for discovering at least one neighbor cell, the method performed by a first cell and comprising:
receiving first discovering resource configuration information from a master cell for managing a group of cells including the first cell and the at least one neighbor cell;
receiving an instruction from the master cell to initiate a measurement procedure when a topology of a network is changed; and
receiving and measuring a discovery signal from the at least one neighbor cell in response to the instruction and based on the first discovering resource configuration information,
wherein the first discovering resource configuration information includes first information indicating a first time resource for allowing the first cell to receive the discovery signal through a first frequency band from the at least one neighbor cell and second information indicating a second time resource for allowing the first cell to transmit downlink data to a user equipment (UE) through the first frequency band, and
wherein transmission of the downlink data and a cell-specific reference signal (CRS) to the UE through the first time resource is suspended.

2. The method of claim 1, wherein:
the discovery signal is received during a discovery signal reception period; and
the discovery signal reception period is a time period configured such that the first cell receives the discovery signal through the first time resource.

3. The method of claim 1, further comprising transmitting the first discovering resource configuration information to the UE, wherein:
the first discovering resource configuration information further includes third information related to a third time resource for allowing the first cell to transmit the discovery signal; and transmission of downlink data to the UE through the third time resource is suspended.

4. The method of claim 1, wherein:
the neighbor cell receives second discovering resource configuration information from the master cell;
the second discovering resource configuration information includes information indicating a third time resource for allowing the first cell to transmit the discovery signal through the first frequency band; and
the first time resource overlaps the third time resource.

5. The method of claim 1, wherein:
the first time resource indicates at least one receiving subframe among a plurality of subframes in which the discovery signal is received; and
the at least one receiving subframe is time varied based on a cell identifier of the first cell.

6. The method of claim 1, further comprising:
generating neighbor cell related information based on the discovery signal; and
transmitting the generated neighbor cell related information to the master cell,
wherein the generated neighbor cell related information includes a cell identifier of the neighbor cell and signal quality information related to the discovery signal.

7. A base station (BS) for discovering at least one neighbor cell, the BS comprising:
a radio frequency (RF) unit configured to transmit and receive a radio signal; and
a processor operatively connected with the RF unit and configured to:
control the RF unit to receive first discovering resource configuration information from a master cell for managing a group of cells including a first cell and the at least one neighbor cell;
control the RF unit to receive an instruction from the master cell to initiate a measurement procedure when a topology of a network is changed; and
control the RF unit to receive and measure a discovery signal from the at least one neighbor cell in response to the instruction and based on the first discovering resource configuration information,
wherein the first discovering resource configuration information includes first information indicating a first time resource for allowing the first cell to receive the discovery signal through a first frequency band and second information indicating a second time resource for allowing the first cell to transmit downlink data to a user equipment (UE) through the first frequency band, and
wherein transmission of the downlink data and a cell-specific reference signal (CRS) to the UE through the first time resource is suspended.

8. The BS of claim 7, wherein:
the discovery signal is received during a discovery signal reception period; and
the discovery signal reception period is a time period configured such that the first cell receives the discovery signal through the first time resource.

9. The BS of claim 7, wherein:
the processor further configured to control the RF unit to transmit the first discovering resource configuration information to the UE;
the first discovering resource configuration information further includes third information related to a third time resource for allowing the first cell to transmit the discovery signal; and
transmission of downlink data to the UE through the third time resource is suspended.

10. The BS of claim 7, wherein:
the neighbor cell receives second discovering resource configuration information from the master cell;
the second discovering resource configuration information includes information indicating a third time resource for allowing the first cell to transmit the discovery signal through the first frequency band; and
the first time resource overlaps the third time resource.

11. The BS of claim 7, wherein:
the first time resource indicates at least one receiving subframe among a plurality of subframes in which the discovery signal is received; and
the at least one receiving subframe is time varied based on a cell identifier of the first cell.

12. The BS of claim 7, wherein the processor is further configured to:
generate neighbor cell related information based on the discovery signal; and
control the RF unit to transmit the generated neighbor cell related information to the master cell,
wherein the generated neighbor cell related information includes a cell identifier of the neighbor cell and signal quality information related to the discovery signal.

* * * * *